United States Patent
Niver

(10) Patent No.: US 9,416,884 B2
(45) Date of Patent: Aug. 16, 2016

(54) FLUID CONTROL VALVE AND ASSEMBLY

(71) Applicant: Kohler Co., Kohler, WI (US)

(72) Inventor: Michael A. Niver, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 461 days.

(21) Appl. No.: 13/802,179

(22) Filed: Mar. 13, 2013

(65) Prior Publication Data

US 2014/0261779 A1    Sep. 18, 2014

(51) Int. Cl.
- *E03C 1/04* (2006.01)
- *F16K 11/20* (2006.01)
- *B01F 5/00* (2006.01)

(52) U.S. Cl.
CPC ............... *F16K 11/20* (2013.01); *B01F 5/008* (2013.01); *Y10T 137/7737* (2015.04); *Y10T 137/86823* (2015.04)

(58) Field of Classification Search
CPC ....................................................... F16K 11/20
USPC ............................................ 4/677; 137/637.3
See application file for complete search history.

(56) References Cited

U.S. PATENT DOCUMENTS

| | | | |
|---|---|---|---|
| 2,145,114 A | 1/1939 | Gibbs et al. | |
| 2,983,279 A | 5/1961 | Biermann | |
| RE25,037 E | 9/1961 | Brazier | |
| 3,385,321 A | 5/1968 | Ehrens et al. | |
| 3,688,790 A | 9/1972 | Esten | |
| 3,724,480 A | 4/1973 | Povalski et al. | |
| 3,770,017 A | 11/1973 | Enterante | |
| 3,794,075 A | 2/1974 | Stoll et al. | |
| 3,823,737 A | 7/1974 | Szymanski | |
| 3,946,756 A | 3/1976 | Specht | |
| 3,987,819 A * | 10/1976 | Scheuermann | 137/637.3 |
| 4,095,610 A | 6/1978 | Priesmeyer | |
| 4,121,761 A | 10/1978 | Nolden | |
| 4,174,726 A | 11/1979 | Arnold et al. | |
| 4,220,175 A | 9/1980 | Keller et al. | |

(Continued)

FOREIGN PATENT DOCUMENTS

| | | |
|---|---|---|
| CN | 1093649 C | 10/1994 |
| CN | 100353101 C | 12/2007 |

(Continued)

OTHER PUBLICATIONS

Aquatite Wetwall Caddy Installation Instructions, 2005, 2 pages.

(Continued)

*Primary Examiner* — Craig Schneider
*Assistant Examiner* — Angelisa L Hicks
(74) *Attorney, Agent, or Firm* — Foley & Lardner LLP

(57) ABSTRACT

A concentric cartridge for fluid mixing valve includes an inlet adapter configured to receive a first fluid and a second fluid, a pressure balance unit, a volume control plate rotatably coupled to the pressure balance unit and positioned between the inlet adapter and the pressure balance unit, a temperature control plate, and a mixing plate positioned between the pressure balance unit and the temperature control plate. The pressure balance unit and the volume control plate are rotatable relative to the inlet adapter and the temperature control plate is rotatable relative to the mixing plate. The mixing plate has an irregularly shaped opening configured to mix fluids with different temperatures such that the temperature of the mixed fluid increases linearly as a function of angular rotation of a temperature control handle.

17 Claims, 22 Drawing Sheets

(56) References Cited

U.S. PATENT DOCUMENTS

| | | | |
|---|---|---|---|
| 4,381,073 A | | 4/1983 | Gloor |
| 4,397,330 A | | 8/1983 | Hayman |
| 4,516,753 A | | 5/1985 | Thomsen |
| 4,609,007 A | | 9/1986 | Uhl |
| 4,662,389 A | | 5/1987 | Igbal |
| 4,681,140 A | * | 7/1987 | Hayman ............... 137/597 |
| 4,699,172 A | * | 10/1987 | MacDonald .......... 137/551 |
| 4,896,381 A | | 1/1990 | Hutto |
| 4,901,916 A | | 2/1990 | Avelov |
| 4,905,732 A | | 3/1990 | Bright et al. |
| 4,915,295 A | | 4/1990 | Pullen et al. |
| 4,923,092 A | | 5/1990 | Kirschner et al. |
| 4,978,059 A | | 12/1990 | Nicklas et al. |
| 4,981,156 A | * | 1/1991 | Nicklas et al. ......... 137/270 |
| 5,129,576 A | * | 7/1992 | Pullen ............. G05D 23/1353 137/637.3 |
| 5,137,048 A | | 8/1992 | Brattoli |
| 5,148,976 A | * | 9/1992 | Reid ....................... 236/12.2 |
| 5,170,816 A | | 12/1992 | Schnieders |
| 5,331,996 A | | 7/1994 | Ziehm |
| 5,340,018 A | | 8/1994 | MacDonald |
| 5,341,845 A | | 8/1994 | Graber |
| 5,355,906 A | | 10/1994 | Marty et al. |
| 5,425,394 A | | 6/1995 | Clare |
| 5,433,378 A | | 7/1995 | Orlandi |
| 5,441,075 A | | 8/1995 | Clare |
| 5,501,244 A | | 3/1996 | Shahriar |
| 5,505,225 A | | 4/1996 | Niakan |
| 5,518,019 A | | 5/1996 | Clare |
| 5,518,022 A | | 5/1996 | Ziehm |
| 5,634,391 A | | 6/1997 | Eady |
| 5,725,010 A | | 3/1998 | Marty et al. |
| 5,730,171 A | | 3/1998 | Niakan |
| 5,732,729 A | | 3/1998 | Shieh |
| 5,807,983 A | | 9/1998 | Jiang et al. |
| 5,829,469 A | | 11/1998 | Sileno et al. |
| 5,845,674 A | * | 12/1998 | Clare ..................... 137/454.2 |
| 5,893,386 A | | 4/1999 | Caria et al. |
| 6,012,476 A | | 1/2000 | Ko |
| 6,050,285 A | | 4/2000 | Goncze et al. |
| 6,052,929 A | | 4/2000 | Canadas |
| 6,123,094 A | | 9/2000 | Breda |
| 6,161,567 A | | 12/2000 | Ziehm |
| 6,237,622 B1 | | 5/2001 | Cook et al. |
| 6,279,604 B1 | | 8/2001 | Korb et al. |
| 6,283,447 B1 | | 9/2001 | Fleet |
| 6,302,131 B1 | | 10/2001 | Pitsch |
| 6,343,619 B1 | | 2/2002 | Pruitt |
| 6,357,476 B1 | | 3/2002 | Moretti |
| 6,378,911 B1 | | 4/2002 | Grohe |
| 6,382,517 B1 | | 5/2002 | Bommelaer et al. |
| 6,427,713 B1 | | 8/2002 | Dempsey et al. |
| 6,484,949 B2 | | 11/2002 | Procter |
| 6,546,948 B2 | | 4/2003 | Tarzia |
| 6,561,548 B1 | | 5/2003 | Mantel et al. |
| 6,718,569 B2 | | 4/2004 | Burger et al. |
| 6,732,754 B2 | | 5/2004 | Ottelli |
| 6,761,184 B1 | | 7/2004 | Jordan |
| 6,832,396 B1 | | 12/2004 | Lin |
| 6,845,785 B1 | | 1/2005 | Condon |
| 6,877,523 B2 | | 4/2005 | Dempsey et al. |
| 6,880,565 B2 | | 4/2005 | Ouyoung |
| 7,021,337 B2 | | 4/2006 | Markham |
| 7,063,098 B2 | | 6/2006 | Sprague |
| 7,073,725 B2 | | 7/2006 | Swadling |
| 7,077,150 B2 | | 7/2006 | McNerney |
| RE39,257 E | | 9/2006 | Kamimura et al. |
| 7,100,630 B2 | | 9/2006 | Vu et al. |
| 7,163,157 B2 | | 1/2007 | Goncze et al. |
| 7,337,804 B2 | | 3/2008 | Rosko |
| 7,344,088 B2 | | 3/2008 | Yang |
| 7,509,971 B2 | | 3/2009 | Kajuch |
| D621,479 S | | 8/2010 | McNerney |
| 7,775,234 B2 | | 8/2010 | Campisi |
| 7,775,450 B2 | | 8/2010 | Warshawsky |
| 7,823,603 B2 | | 11/2010 | Cochart et al. |
| 7,841,362 B2 | | 11/2010 | Kim |
| 7,874,318 B2 | | 1/2011 | Malone et al. |
| 8,162,001 B2 | | 4/2012 | Yang |
| 8,176,934 B2 | | 5/2012 | Niver |
| 8,408,239 B2 | | 4/2013 | King |
| 2003/0213850 A1 | | 11/2003 | Mayer et al. |
| 2004/0094214 A1 | | 5/2004 | Ottelli |
| 2004/0261864 A1 | | 12/2004 | Coll |
| 2005/0067017 A1 | | 3/2005 | Condon et al. |
| 2006/0231140 A1 | | 10/2006 | McNerney |
| 2008/0029156 A1 | | 2/2008 | Rosal et al. |
| 2008/0053528 A1 | | 3/2008 | Breda |
| 2009/0242051 A1 | * | 10/2009 | Xinlu et al. ............ 137/603 |
| 2009/0260696 A1 | | 10/2009 | Cruickshank et al. |
| 2010/0006169 A1 | * | 1/2010 | Bolgar et al. .......... 137/898 |
| 2010/0058534 A1 | * | 3/2010 | Martin et al. .......... 4/677 |
| 2010/0212759 A1 | | 8/2010 | DeVries et al. |
| 2011/0265890 A1 | | 11/2011 | Killian |
| 2011/0266355 A1 | | 11/2011 | Yang |
| 2012/0180887 A1 | | 7/2012 | Yan |
| 2012/0279595 A1 | | 11/2012 | Huck et al. |

FOREIGN PATENT DOCUMENTS

| | | |
|---|---|---|
| CN | 101629643 A | 1/2010 |
| EP | 0 358 317 A2 | 3/1990 |
| EP | 2 358 947 B1 | 8/2011 |
| WO | WO 2010/069606 | 6/2010 |

OTHER PUBLICATIONS

Delta, MultiChoice Installation Instructions, 2011, 6 pages.

Hansgrohe, iBox Universal Plus, Planning and Installation, Mar. 2011, 26 pages.

* cited by examiner

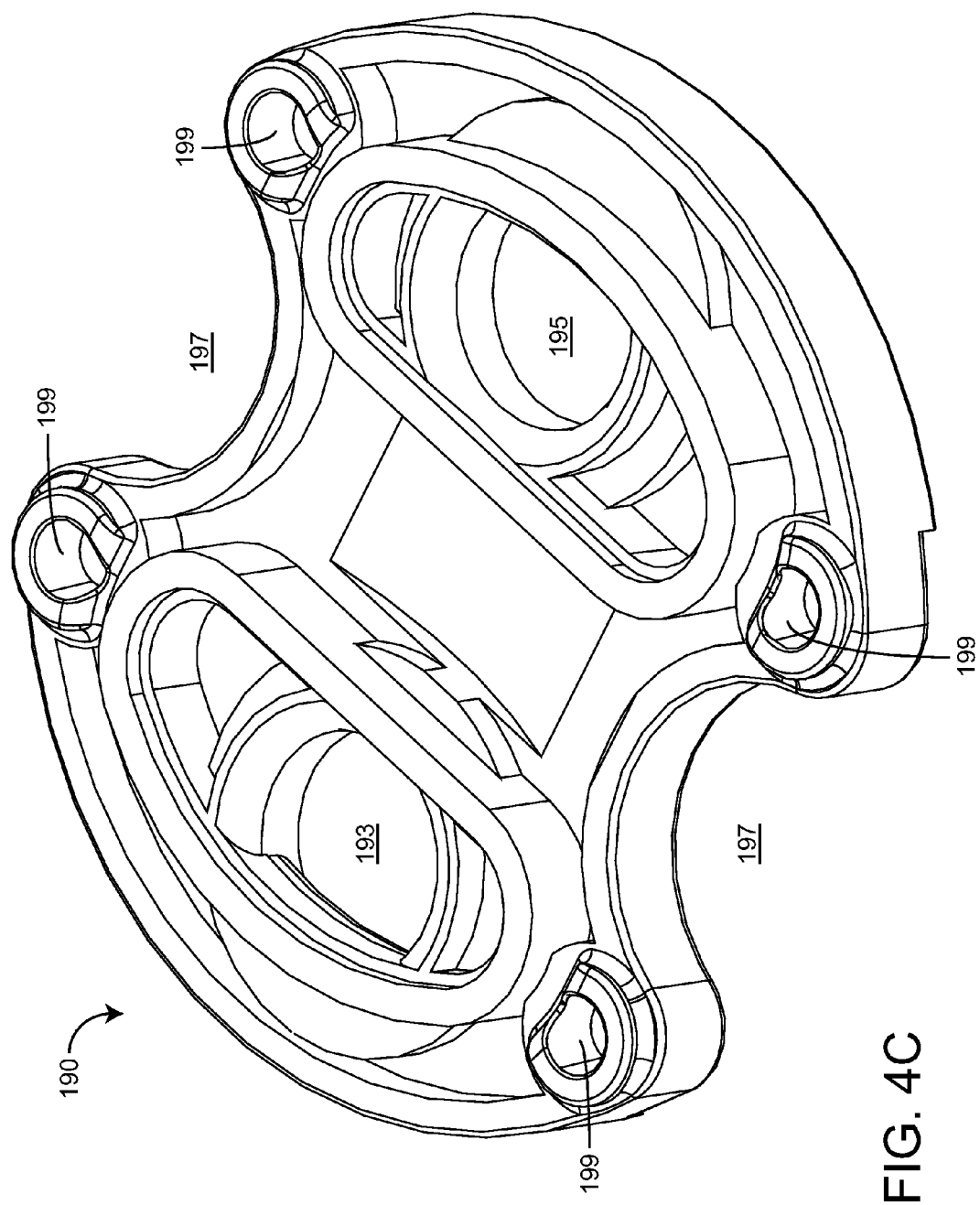

FLUID CONTROL VALVE AND ASSEMBLY

BACKGROUND

The present invention relates to a valve assembly for a fluid control device. Particularly, the present invention relates to a concentric cartridge for the valve assembly for controlling fluid volume and fluid temperature.

Valve assemblies are used in a variety of plumbing fixtures for controlling the temperature and volume of water dispensed from the fixture. A valve assembly may receive hot water and cold water from separate supply lines and controllably mix the water to provide an output having an intermediate temperature.

Sequential valve assemblies use a single handle that, upon rotation, opens the valve and increases the volumetric flow rate to maximum flow of cold water. Continued rotation of the handle maintains the volumetric flow rate while increasing the temperature.

Other valve assemblies use two concentrically mounted handles or dials, one to control temperature and one to control volumetric flow rate. Such valve assemblies are typically referred to as "concentric" valves. Current concentric valves suffer from the disadvantage that the concentric controls are frequently interdependent. For example, turning the outer concentric volume control dial may cause the inner concentric temperature control dial to rotate. This results in the inability to set the desired temperature (e.g., by turning an inner concentric dial) until after the volumetric flow rate has been set (e.g., by turning the outer dial). Thus, a user may be required to set both temperature and flow rate sequentially each time the valve is operated.

SUMMARY

One implementation of the present disclosure is a concentric cartridge a for fluid mixing valve. The concentric cartridge may include an inlet adapter configured to receive a first fluid and a second fluid, a pressure balance unit, a volume control plate rotatably coupled to the pressure balance unit and positioned between the inlet adapter and the pressure balance unit, a temperature control plate, and a mixing plate positioned between the pressure balance unit and the temperature control plate. The pressure balance unit and the volume control plate may be rotatable relative to the inlet adapter and the temperature control plate may be rotatable relative to the mixing plate.

In some embodiments, the pressure balance unit and the volume control plate are rotatably coupled such that rotation of the pressure balance unit causes rotation of the volume control plate. The pressure balance unit and the volume control plate may be configured to rotate between a full-volume position in which the first fluid and the second fluid are permitted to flow through the volume control plate and into the pressure balance unit, and a no-volume position in which the first fluid and the second fluid are blocked from entering the pressure balance unit by the volume control plate. In some embodiments, the pressure balance unit is coupled to a central shaft defining an axis. Rotation of the central shaft may cause rotation of the pressure balance unit relative to the inlet adapter. The central shaft may be configured to attach to a user-operable volume control handle. The pressure balance unit may be rotatable via the user-operable volume control handle.

In some embodiments, the temperature control plate is configured to rotate between a first position in which the first fluid is permitted to enter a mixing chamber through a first opening in the mixing plate and the second fluid is blocked by the temperature control plate from entering the mixing chamber, and a second position in which the second fluid is permitted to enter the mixing chamber through a second opening in the mixing plate and the first fluid is blocked by the temperature control plate from entering the mixing chamber. In some embodiments, the temperature control plate may be coupled to a connecting sleeve formed around the central shaft. Rotation of the connecting sleeve may cause rotation of the temperature control plate relative to the mixing plate. The connecting sleeve may be configured to attach to a user-operable temperature control handle. The temperature control plate may be rotatable via the user-operable temperature control handle.

In some embodiments, rotation of the pressure balance unit does not cause the temperature control plate to rotate and rotation of the temperature control plate does not cause the pressure balance unit to rotate. In some embodiments, the mixing plate does not rotate.

Another implementation of the present disclosure is a concentric fluid control valve including a volume control shaft and a temperature control sleeve formed around the volume control shaft. The volume control shaft and the temperature control sleeve may be independently rotatable about a shared axis such that rotation of the volume control shaft does not cause the temperature control sleeve to rotate and wherein rotation of the temperature control sleeve does not cause the volume control shaft to rotate. In some embodiments, the volume control shaft is configured to attach to a user-operable volume control handle and the temperature control sleeve is configured to attach to a user-operable temperature control handle. Rotation of the volume control handle may cause rotation of the volume control shaft and rotation of the temperature control handle may cause rotation of the temperature control sleeve.

In some embodiments, the concentric valve further includes a volume control plate having a first opening and a second opening. Rotation of the volume control shaft may cause rotation of the volume control plate between a first position in which the first and second openings are fluidly connected with respective first and second fluid supply lines, and a second position in which the first and second openings are not fluidly connected with the respective first and second fluid supply lines.

In some embodiments, the concentric valve further includes a temperature control plate. Rotation of the temperature control sleeve may cause rotation of the temperature control plate between a first position in which a first fluid is permitted to enter a mixing chamber and a second fluid is blocked from entering the mixing chamber, and a second position in which the second fluid is permitted to enter the mixing chamber and the first fluid is blocked from entering the mixing chamber.

In some embodiments, the concentric valve further includes a first marker independently rotatable about the shared axis for indicating a first preferred position of the volume control handle or the temperature control handle. The first marker may remain substantially stationary during rotation of the volume control handle and during rotation of the temperature control handle. In some embodiments, the concentric valve further includes a second marker independently rotatable about the shared axis for indicating a second preferred position of the volume control handle or the temperature control handle. The second marker may remain substantially stationary during rotation of the volume control handle and during rotation of the temperature control handle and wherein the second marker is distinguishable from the first marker.

Another implementation of the present disclosure is a mixing plate including a disc and an opening passing through the disc. The opening may include a first end, a second end, and a side extending therebetween. In some embodiments, the side of the opening is not continuously curved. The opening may have an irregular profile. In some embodiments, the opening may be neither tear-shaped nor kidney-shaped.

In some embodiments, the mixing plate further includes a plurality of segments, wherein at least two of the segments have different radii of curvature. In some embodiments, at least three of the segments have different radii of curvature. In some embodiments, at least one of the segments is a concave segment with respect to the opening and wherein at least one of the segments is a convex segment with respect to the opening. In some embodiments, the end includes a plurality of segments, and at least two of the end segments have different radii of curvature. In some embodiments, at least one of the end segments is a concave segment with respect to the opening, and at least one of the end segments is a convex segment with respect to the opening.

Another implementation of the present disclosure is a mixing plate including a disc. The disc may include a first opening passing through the disc and a second opening passing through the disc. The first opening may be configured to receive a first fluid having a first temperature and the second opening may be configured to receive a second fluid having a second temperature. The first fluid and the second fluid may pass through the first opening and the second opening respectively and combine to form a third fluid having a third temperature. In some embodiments, the mixing plate is configured to control the third temperature by controlling an amount of the first fluid permitted to pass through the disc relative to an amount of the second fluid permitted to pass through the disc. Rotation of a handle between a first end position and a second end position may control the amount of the first fluid permitted to pass through the disc relative to the amount of the second fluid permitted to pass through the disc.

In some embodiments, when the handle is rotated into a first intermediate position approximately 30 degrees from the first end position, the third temperature may be approximately equal to the first temperature. When the handle is rotated into a second intermediate position approximately 50 degrees from the first end position, the third temperature may be approximately halfway between the first temperature and the second temperature. Continued rotation of the handle between the second intermediate position and the second end position may cause a substantially linear increase in the third temperature until the handle reaches an end position in which the third temperature is approximately equal to the second temperature.

Another implementation of the present disclosure is cartridge for a fluid control valve. The cartridge may be configured to receive a first fluid having a first temperature, receive a second fluid having a second temperature, combine the first fluid and the second fluid to form a mixed fluid having an intermediate temperature, and control the intermediate temperature. Rotation of a temperature control handle attached to the cartridge between a first end position and a second end position may be used to control the intermediate temperature. When the handle is rotated into a first intermediate position approximately 30 degrees from the first end position, the intermediate temperature may be approximately equal to the first temperature. When the handle is rotated into a second intermediate position approximately 50 degrees from the first end position, the intermediate temperature may be approximately halfway between the first temperature and the second temperature. Continued rotation of the handle between the second intermediate position and the second end position may cause a substantially linear increase in the third temperature until the handle reaches an end position in which the third temperature is approximately equal to the second temperature.

Another implementation of the present disclosure is a fluid control valve. The fluid control valve includes a mixing plate and a control handle interconnected with the mixing plate. The mixing plate includes a first opening configured to receive a first fluid having a first temperature and a second opening configured to receive a second fluid having a second temperature, wherein the first fluid and the second fluid combine to form a third fluid having a third temperature. Rotation of the control handle controls the third temperature, and at least one of the first opening and the second opening has an irregular profile.

In some embodiments, the valve is configured to effect an increase in the third temperature from the first temperature to a temperature approximately halfway between the first temperature and the second temperature as the control handle is rotated by approximately 15 degrees. In some embodiments, the valve is configured to effect a substantially linear change in the third temperature as a function of control handle rotation, and the third temperature increases substantially linearly from a temperature approximately halfway between the first and second temperatures to the second temperature. In some embodiments, the substantially linear change in the third temperature as a function of control handle rotation occurs throughout a rotational range of the control handle, and the rotational range of the control handle over which the substantially linear increase in the third temperature occurs is at least 50 degrees. In some embodiments, the rotational range of the control handle over which the substantially linear increase in the third temperature occurs is at least 75 degrees. In some embodiments, the rotational range of the control handle over which the substantially linear increase in the third temperature occurs is at least 100 degrees.

BRIEF DESCRIPTION OF THE FIGURES

FIG. 4C is a drawing of a transition element configured to link the pressure balance unit with the volume control plate, according to an exemplary embodiment.

DETAILED DESCRIPTION

Figure 1:
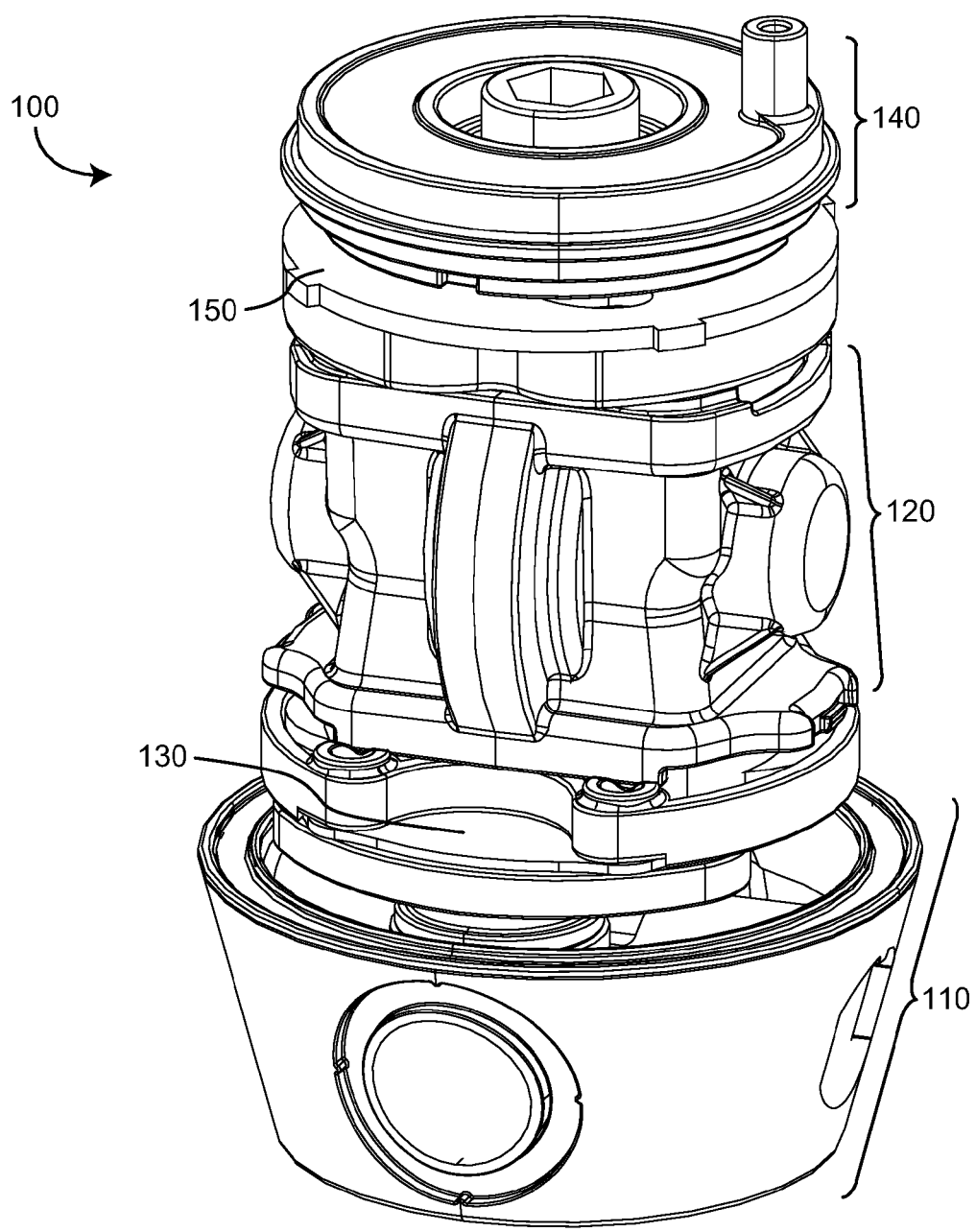
FIG. 1 is a drawing of a concentric fluid control cartridge including an inlet adapter, a volume control plate, a pressure balance unit, a mixing plate, and a temperature control plate, according to an exemplary embodiment.

Referring to FIG. 1, a concentric fluid control cartridge 100 is shown, according to an exemplary embodiment. Concentric cartridge 100 is shown to include an inlet adapter 110, a pressure balance unit 120, a volume control plate 130, a temperature control plate 140, and a mixing plate 150. In operation, two fluids from separate fluid supply lines (e.g., hot water and cold water) may enter inlet adapter 110 via separate inlet ports. Inlet adapter 110 may deliver the fluids through volume control plate 130 and into pressure balance unit 120. Pressure balance unit 120 may then output the fluids through mixing plate 150 into a mixing chamber where the fluids are combined.

Advantageously, temperature control and volume control may be substantially or truly independent. For example, temperature control plate 140 may be rotated via an external temperature control handle to variably cover or uncover slots in mixing plate 150 for controlling the temperature of the mixed fluid. Pressure balance unit 120 and volume control plate 130 may be rotated via an external volume control handle to control the volumetric flow rate of the fluids into pressure balance unit 120. The positions of the temperature control handle and the volume control handle may be adjusted independently, thereby allowing a user to control each of temperature and volumetric flow rate without affecting the other.

Additionally, concentric cartridge 100 may perform volume control before the fluids enter pressure balance unit 120 by rotating pressure balance unit 120 and volume control plate 130 relative to inlet adapter 110, thereby closing the fluid connection between inlet adapter 110 and pressure balance unit 120. Closing the fluid connection between pressure balance unit 120 and inlet adapter 110 may protect the diaphragm and sliding element of pressure balance unit 120 from damage (e.g., water hammer effects) and may prevent fluid crossover (e.g., in the event of a diaphragm failure) when the fluid connection is closed.

Figure 2A:
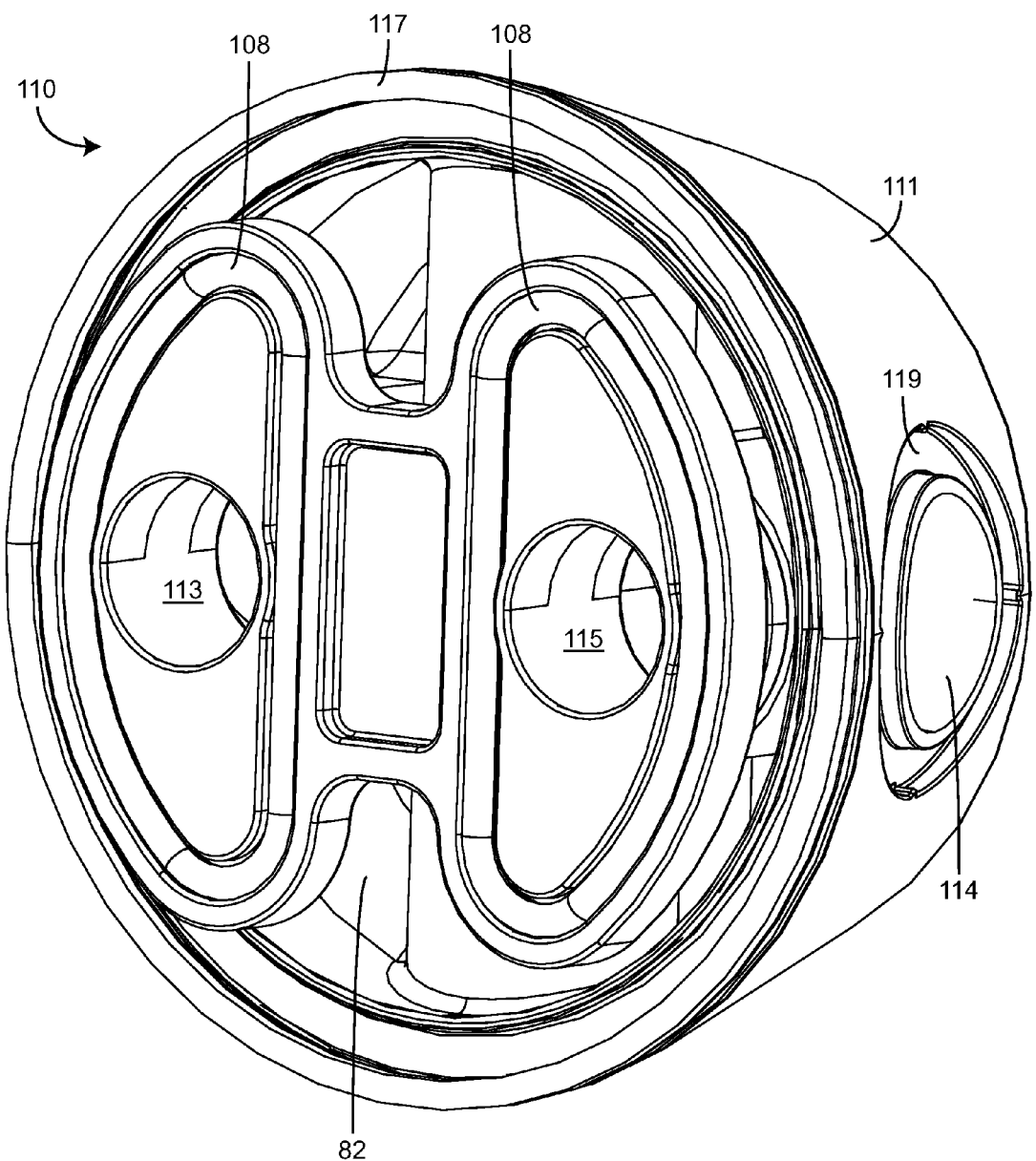
FIG. 2A is a front perspective view of the inlet adapter, according to an exemplary embodiment.
Figure 2B:
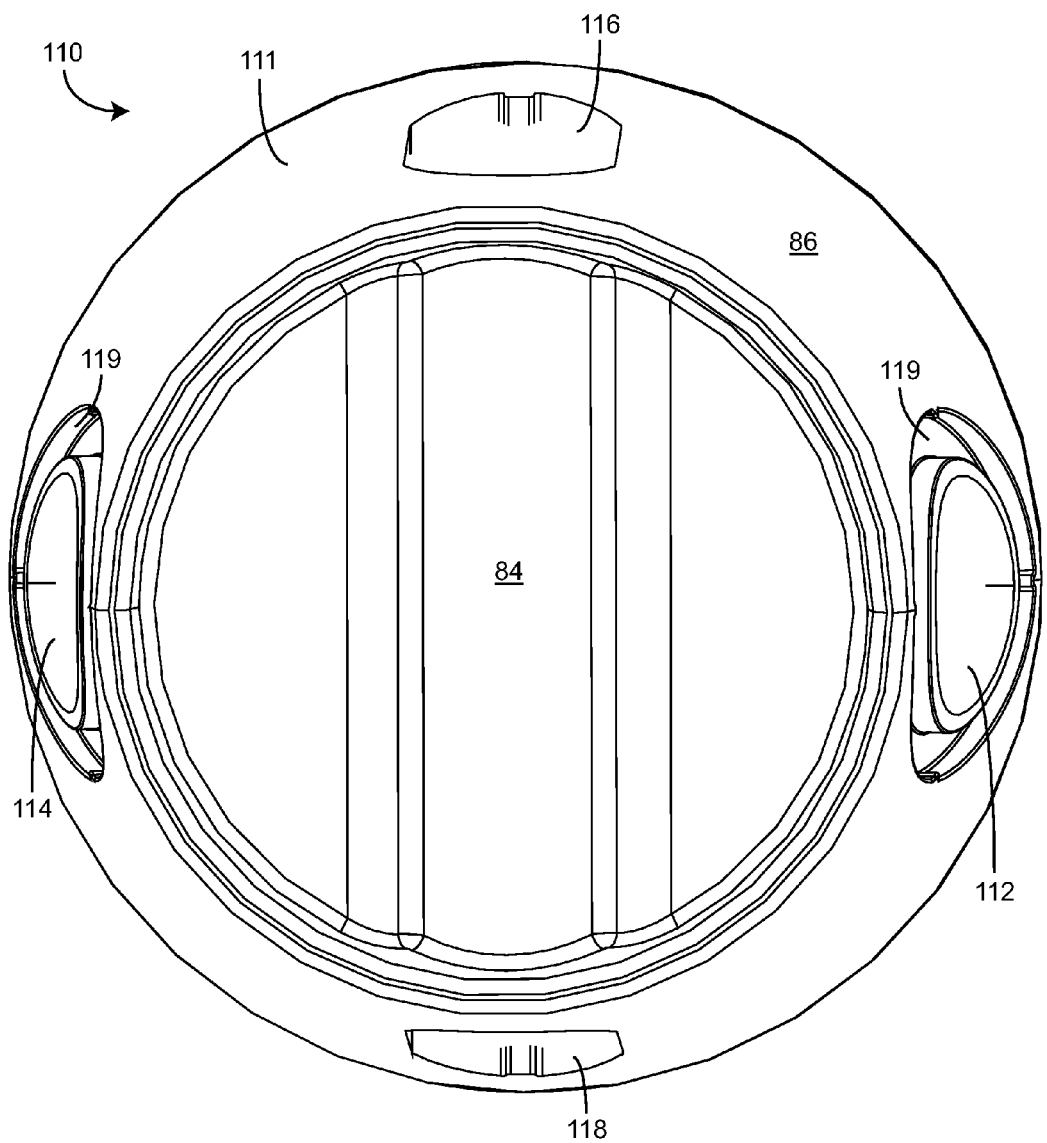
FIG. 2B is a rear elevation view of the inlet adapter, according to an exemplary embodiment.

Referring now to FIGS. 2A and 2B, a front perspective view and rear elevation view of inlet adapter 110 are shown, according to an exemplary embodiment. Adapter 110 may include a shell 111, a first inlet port 112, a first connection port 113, a second inlet port 114, a second connection port 115, a first outlet port 116, a second outlet port 118, seal grooves 119, and a connection seal 117.

In some embodiments, shell 111 may be configured to be inserted into a valve body as part of a valve assembly. For example, shell 111 may be configured to align with the walls of the valve body. In some embodiments shell 111 may have a front face 82, a rear face 84, and a side wall 86. In some embodiments, front face 82 and rear face 86 may be parallel. Side wall 86 may connect front face 82 with rear face 84. In some embodiments, front face 82 and the rear face 84 may be substantially circular. The radius of front face 82 may exceed the radius of rear face 84. Side wall 86 may intersect front face 82 and rear face 84 at an angle of intersection. In some embodiments, the angle of intersection may be between 30° and 60°. In other embodiments, the angle of intersection may be between 60° and 90°. In further embodiments, the angle of intersection may be approximately 45° or approximately 75°. In some embodiments, shell 111 may be substantially frustoconical. In some embodiments, frustoconical shell 111 may be configured to align with a frustoconical portion of a valve body. In other embodiments, shell 111 may be substantially cylindrical or have any other shape.

In some embodiments, front face 82 may be open. Advantageously, open face 82 may allow a mixed fluid to re-enter adapter 110 after traveling through the other components of cartridge 100. For example, in some embodiments, concentric cartridge 100 may be contained within a housing. After passing through mixing plate 150, the fluids may enter a mixing chamber defined by an open volume between cartridge 100 and the housing. The housing may contain the mixed fluid and guide the mixed fluid back into shell 111 through face 82. An exemplary housing is described in greater detail in reference to FIG. 2E.

Still referring to FIGS. 2A and 2B, adapter 110 may further include a first inlet port 112 and a second inlet port 114. Ports 112,114 may define openings in shell 111 through which fluid from separate fluid supply lines may enter cartridge 100. Ports 112,114 may align with inlet ports in a valve body into which adapter 110 may be inserted. For example, port 112 may align with a hot water supply line and port 114 may align with a cold water supply line. Ports 112,114 may be fluidly connected with connection ports 113,115 for delivering the fluids to pressure balance unit 120. In other words, fluid may be permitted to flow between ports 112 and 113 and between ports 114 and 115. In some embodiments, ports 112,114 may be substantially circular. In other embodiments, ports 112, 114 may be rectangular, oval shaped, or have any other cross-sectional shape. According to the exemplary embodiments shown, the shape of inlet ports 112,114 is that of a cylinder intersecting the frustoconical wall of shell 111.

Adapter 110 may further include a first connection port 113 and a second connection port 115. Ports 113,115 may define openings in adapter 110 through which the individual fluids may exit adapter 110 and enter pressure balance unit 120. Connection port 113 may be fluidly connected to inlet port 112 and connection port 115 may be fluidly connected to inlet port 114. In some embodiments, ports 113,115 may be circular as shown in FIG. 2A. In other embodiments, ports 113,115 may be, "kidney-shaped," oval-shaped, arc-shaped, teardrop-shaped, or have any other shape.

In some embodiments, connection ports 113,115 may include perimeter seals 108 around each port. Perimeter seals 108 may form a fluid barrier around ports 113,115 and openings in volume control plate 130. Perimeter seals 108 may allow volume control plate 130 to rotate or move relative to inlet adapter 110 while maintaining the fluid barrier. In some embodiments, perimeter seals 108 may be kidney-shaped. The shape of seals 108 may correspond to a rotational path of fluid openings in volume control plate 130 as plate 130 rotates relative to inlet adapter 110. In some embodiments, seals 108 may be positioned or shaped to allow sufficient distance between ports 113,115 and seals 108 such that openings in volume control plate 130 become fluidly disconnected with ports 113,115 before encountering seals 108. In some embodiments, the fluid disconnection may be complete whereas in other embodiments the fluid disconnection may be partial. Seals 108 may be configured to maintain contact with a solid face of volume control plate 130 (e.g., instead of sliding over an opening in the plate) as the volume control plate rotates. In some embodiments, contact may be maintained along an entire perimeter of seal 108. Advantageously, maintained contact between seals 108 and volume control plate 130 may prevent an edge of the volume control plate from crossing the seal 108 and causing wear thereto. This reduced susceptibility to wear and/or damage may improve the durability of seals 108.

Still referring to FIGS. 2A and 2B, adapter 110 may further include a first outlet port 116 and a second outlet port 118. Ports 116,118 may define openings in shell 111 through which mixed fluid may exit adapter 110. Ports 116,118 may align with outlet ports in a valve body into which cartridge 100 may be inserted. Port 116 may direct fluid to one plumbing fixture (e.g., a bathtub faucet) and port 118 may direct fluid to another plumbing fixture (e.g., a shower head). According to the exemplary embodiments shown, the outlet ports 116,118 have the shape of a circular or elliptical cylinder intersection the frustoconical wall of shell 111.

In some embodiments, adapter 110 may further include a connection seal 117. Seal 117 may be formed around the perimeter of front face 82. Seal 117 may provide a fluid barrier between shell 111 and a housing to which shell 111 may connect. Seal 117 may prevent fluid from leaking from shell 111 (e.g., between shell 111 and the housing). In some embodiments, seal 117 may be substantially circular. In other embodiments, seal 117 may be oval-shaped, rectangular, or any other shape. In some embodiments, seal 117 may be shaped to match the shape of front face 82 or shell 111. Seal 117 may be an o-ring formed from rubber or any other suitable material.

Still referring to FIGS. 2A and 2B, adapter 110 may further include seal grooves 119. seal grooves 119 may circumscribe some or all of ports 112,114,116,118. Seal grooves 119 may be configured to receive port seals (e.g. port seals 87) which provide a fluid barrier between shell 111 and the circumscribed ports. In some embodiments, port seals 87 may be separate o-rings individually circumscribing each port. In other embodiments, seals 87 may be linked.

Figure 2C:
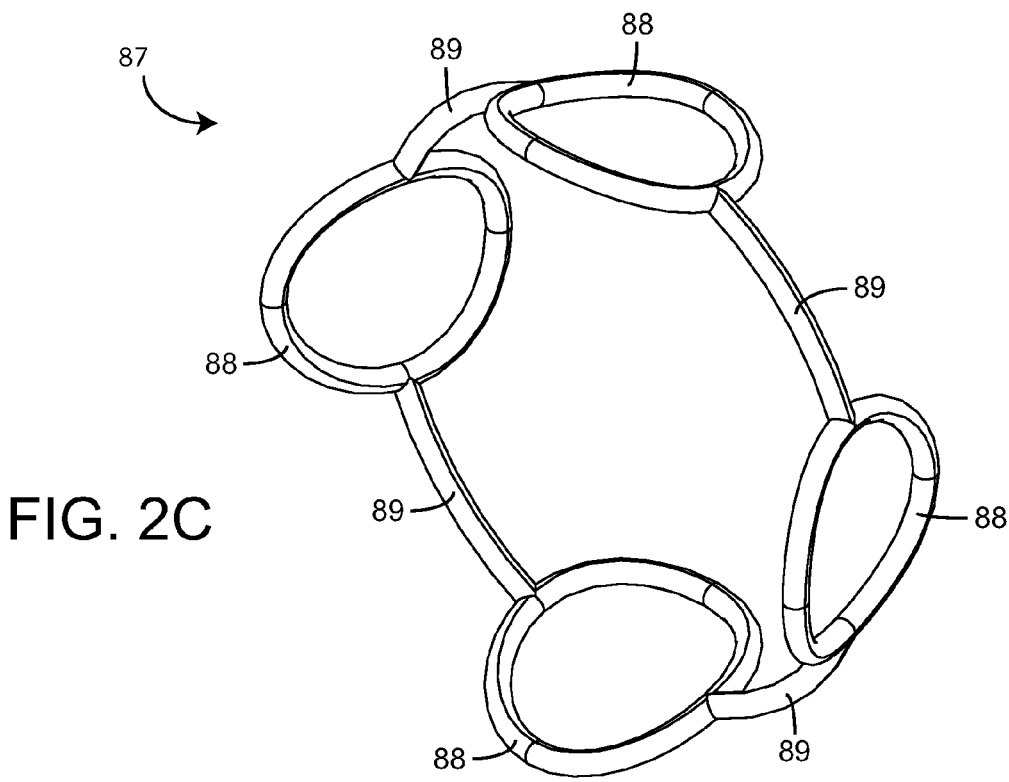
FIG. 2C is a drawing showing a plurality of port seals connected by arc segments, according to an exemplary embodiment.

Referring now to FIG. 2C, seals 87 are shown in a linked configuration, according to an exemplary embodiment. Seals 87 may be include several o-rings 88. O-rings 88 may be joined by arc segments 89. The combined arc segments 89 may form a larger circle configured to circumscribe inlet adapter 110 (e.g., extending along a circumference of side wall 86). O-rings 88 may fit around ports 112,114,116,118 when inserted into shell 111. In some embodiments, o-rings 88 may be positioned approximately 90° apart along the larger circle. Port seals 87 may be made of rubber, or any other suitable material.

Figure 2D:
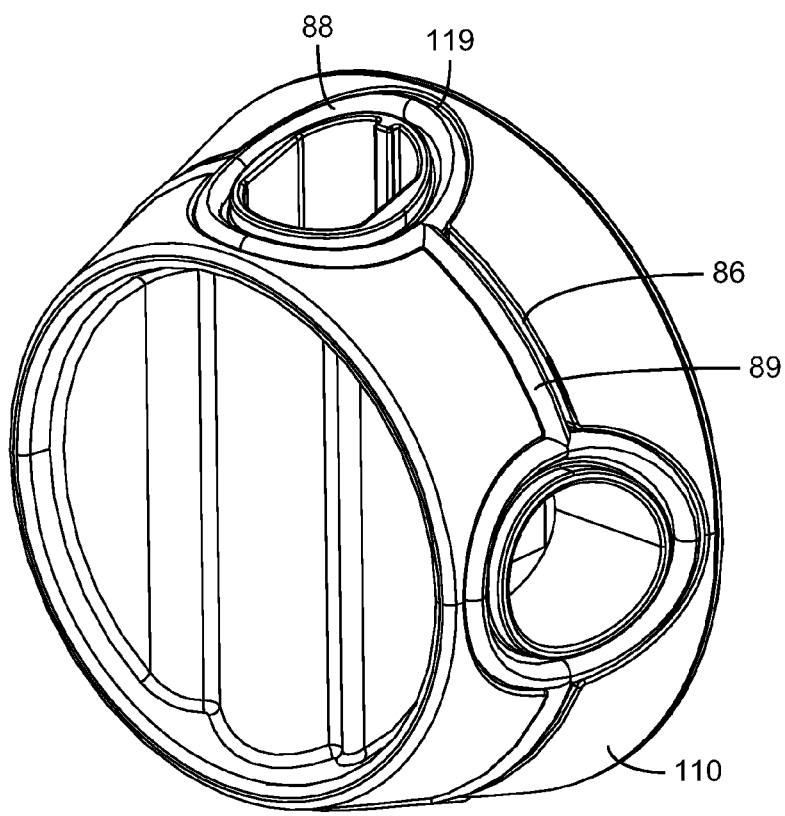
FIG. 2D is a drawing showing the port seals around the inlet and outlet ports of the inlet adapter, according to an exemplary embodiment.

Referring now to FIG. 2D, port seals 87 are shown around inlet adapter 110. O-rings 88 may fit within seal grooves 119 around inlet ports 112,114 and outlet ports 116,118. In some embodiments, shell 111 may include grooves 86 extending between ports 112,114,116,118. Grooves 86 may be configured to contain arc segments 89 along a circumference of shell 111.

Figure 2E:
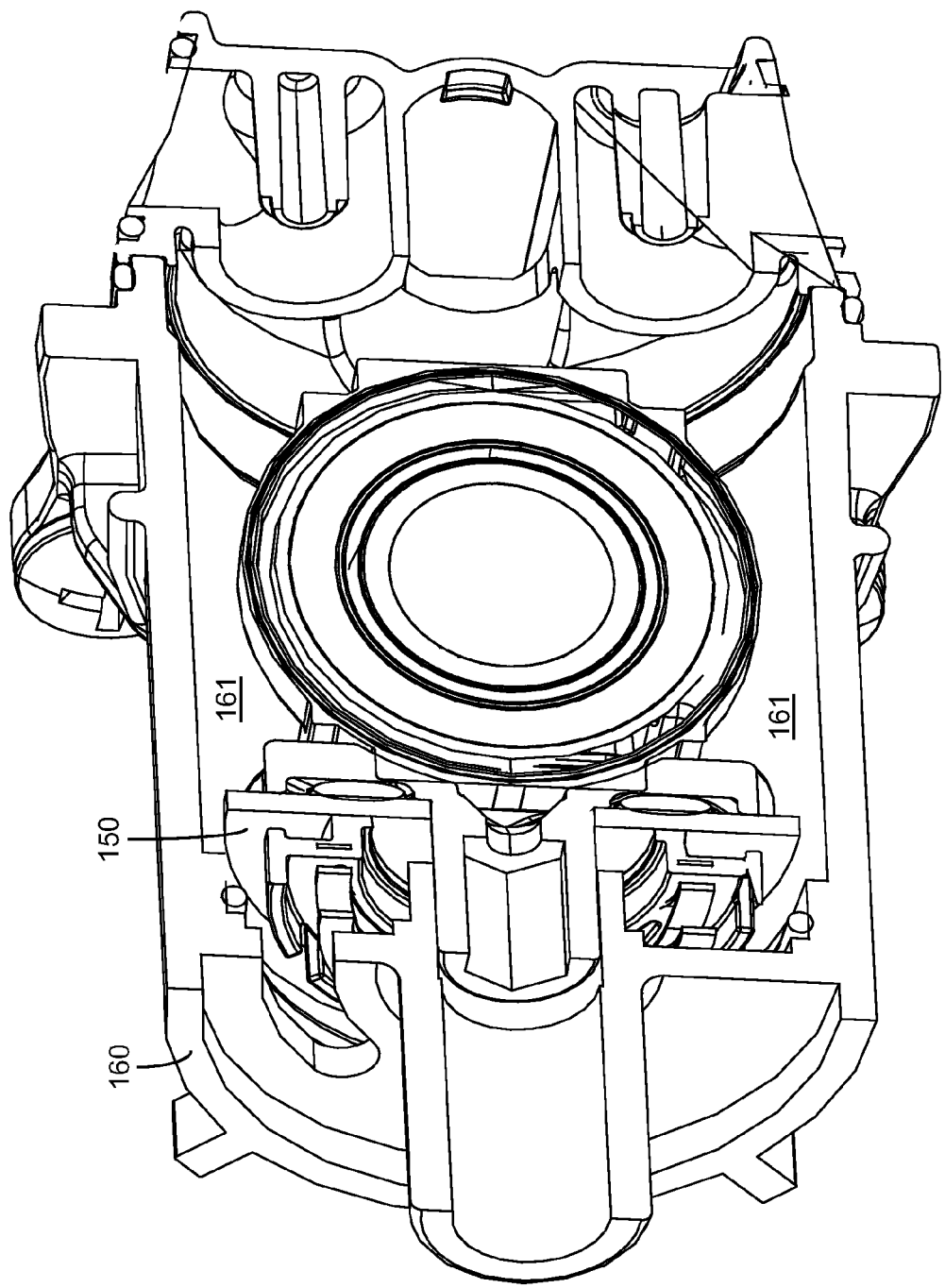
FIG. 2E is a half-sectional view of the concentric fluid control cartridge installed within a housing, according to an exemplary embodiment.

Referring now to FIG. 2E, a half-sectional view of cartridge 100 is shown, according to an exemplary embodiment. In some embodiments, cartridge 100 may further include a housing 160. Housing 160 may contain, support, insulate, or protect the other components of cartridge 100. Housing 160 may also contain, guide, or channel the mixed fluid once the fluid has passed through said components. For example, after passing through mixing plate 150, the individual fluids (e.g., hot water and cold water) may combine in a mixing chamber 161 defined as the open volume between cartridge 100 and housing 160. Housing may contain the mixed fluid and guide the mixed fluid around components 120-150 and back into adapter 110 through the open face in shell 111.

Figure 2F:
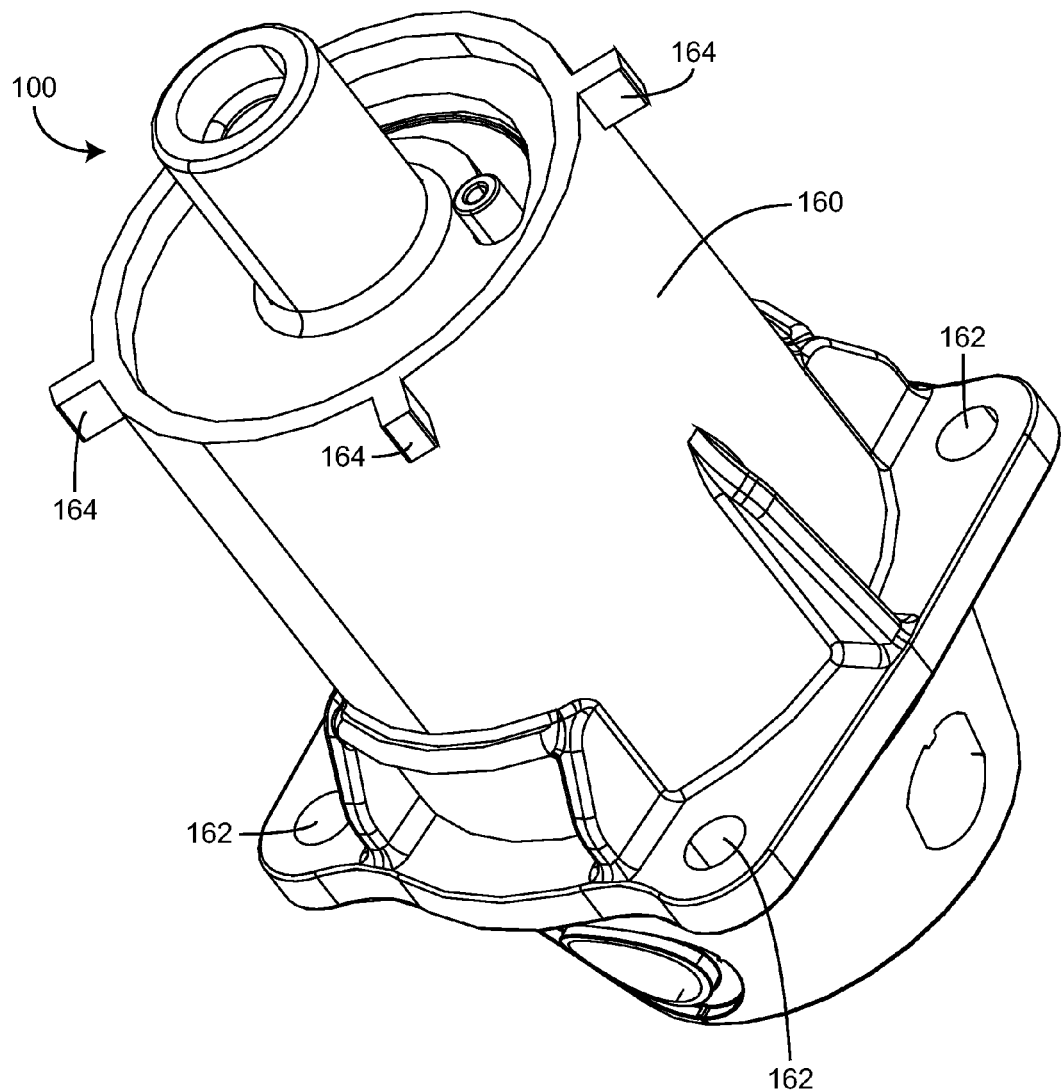
FIG. 2F is a perspective view of the concentric fluid control cartridge installed within a housing, according to an exemplary embodiment.

Referring now to FIG. 2F, in some embodiments, housing 160 may include one or more holes 162. Holes 162 may be used to attach and secure housing 160 to a valve body. Holes 162 may be threaded or unthreaded. In some embodiments, holes 162 may allow screws, bolts, pins, or other fasteners to pass through housing 160. For example, when cartridge 100 is inserted into a valve body, holes 162 may align with holes in the valve body. Screws or other fastening hardware may be inserted through holes 162 and engage the holes in the valve body. In other embodiments, holes 162 may extend only partially through housing 160. Holes 162 may be configured to engage with a threaded bolt for fastening, securing, or attaching housing 160 to a valve body or other hardware component.

In some embodiments, housing 160 may include flanges 164. Flanges 164 may assist in securing cartridge 100 in an operating position (e.g., between a valve body and a wall). For example, flanges 164 may be configured to engage a plate, sheet, disc, or other planar element. The planar element may align with an installation surface, thereby securing cartridge 100 in an installed or operating position. Flanges 164 may engage an article of installation hardware or may engage an installation surface directly. In the exemplary embodiment, flanges 164 extend radially from housing 160 and are spaced 90° apart along a circumference of housing 160. In some embodiments, flanges 164 may be replaced with threads (e.g., along an exterior surface of housing 160), holes, pegs, slots, sockets, or other connection, attachment, fastening, or stabilization elements.

Figure 2G:
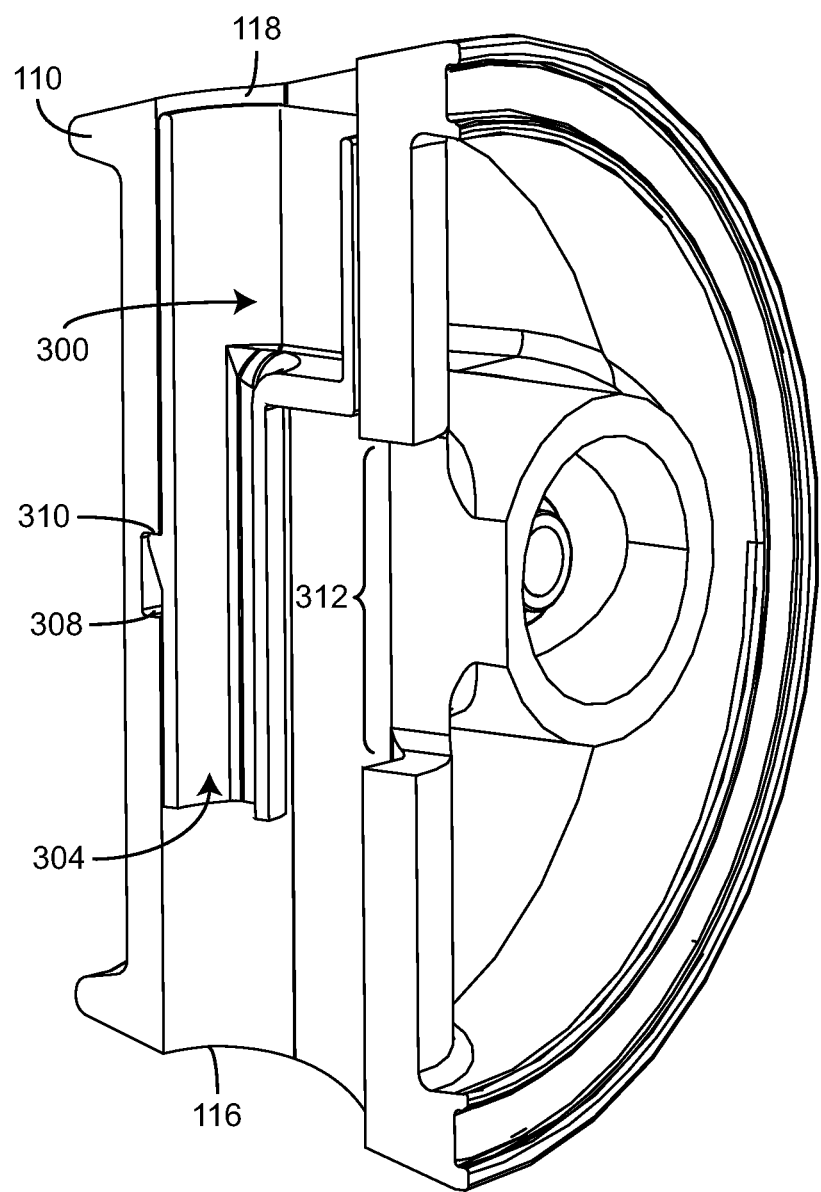
FIG. 2G is a half-sectional view of the inlet adapter and an aspirator installed within the inlet adapter for directing fluid to a selected outlet port, according to an exemplary embodiment.

Referring now to FIG. 2G, a half-sectional view of inlet adapter 110 and an aspirator 300 is shown, according to an exemplary embodiment. In some embodiments, adapter 110 may include an aspirator connection 308. Aspirator connection 308 may be an indentation, groove, snap fitting, notch, socket, or other connecting feature. Connection 308 may be configured to hold aspirator 300 in an operating position within adapter 110. In some embodiments, aspirator connection 308 may be positioned within shell 111 between outlet ports 116,118. Aspirator 300 may be used to selectively direct the mixed fluid to either outlet port 116 or outlet port 118. Advantageously, aspirator connection 308 may allow aspirator 300 to be removed from adapter 110 and re-inserted in a different orientation. For example, the aspirator connection may allow the aspirator to be removed from the cartridge 100, rotated (e.g., by 180°, by 90°, etc.) and re-inserted into the cartridge 100. Aspirator 300 is shown to include a peg 310. Peg 310 may be configured to engage connection 308 for securing aspirator 300 in an operating position.

Figure 2H:
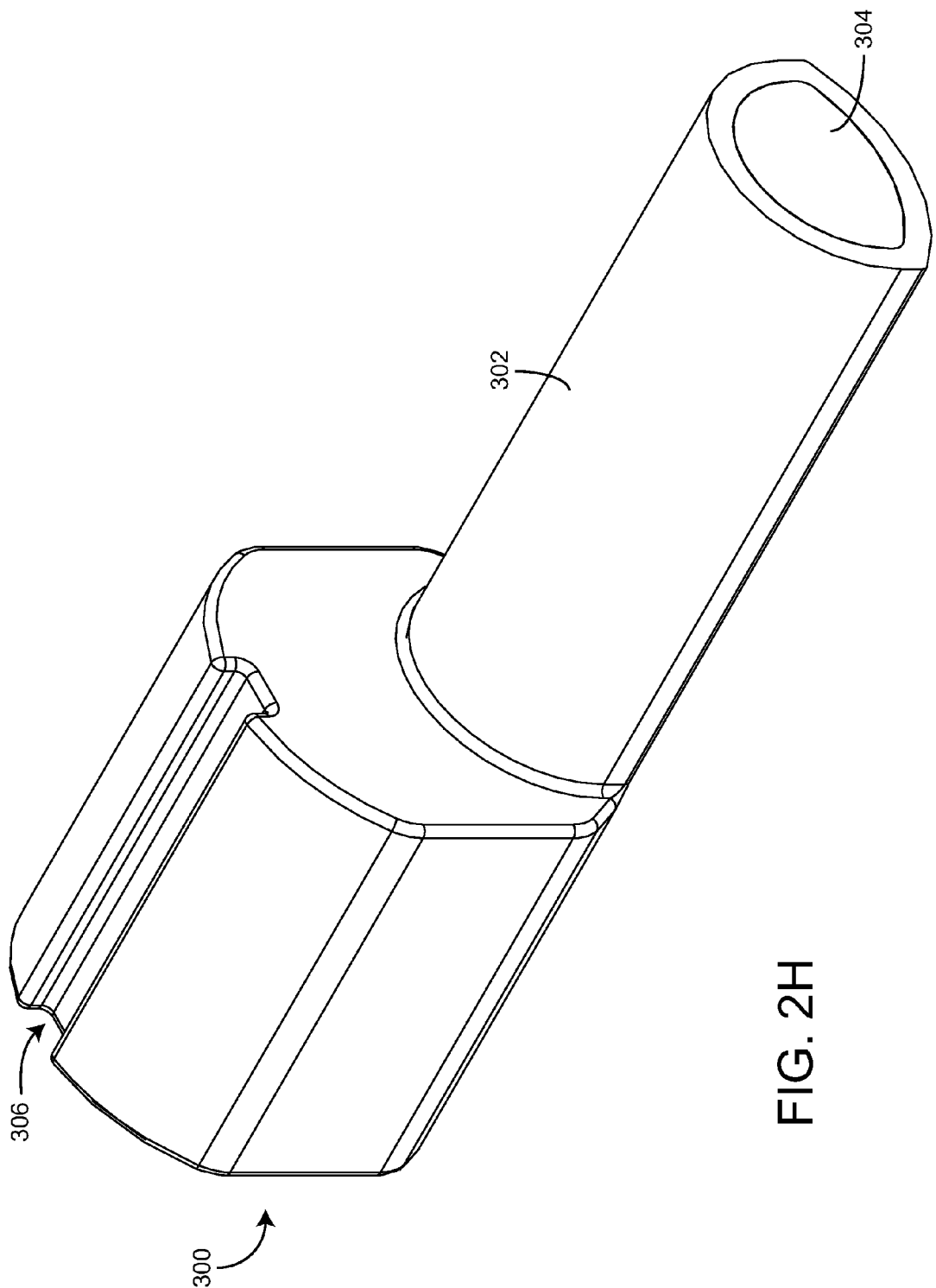
FIG. 2H is a perspective view of the aspirator, according to an exemplary embodiment.

Referring now to FIG. 2H, a perspective view of aspirator 300 is shown, according to an exemplary embodiment. Aspirator 300 is shown to include a surface 302, a fluid channel 304, and a slot 306. Aspirator 300 may receive fluid a direction perpendicular to surface 302 through an opening 312 in adapter 110. Aspirator 300 may initially direct the fluid toward outlet port 116. In an exemplary embodiment, outlet port 116 may be fluidly connected to a bathtub faucet. Therefore, in some embodiments, aspirator 300 may initially direct fluid toward the bathtub faucet. However, if the bathtub faucet is closed (e.g., by a user electing to take a shower), such closure may prevent the fluid from exiting adapter 110 through outlet port 116. In this situation, aspirator 300 may guide the fluid through channel 304 and out of adapter 110 via outlet port 118.

Aspirator 300 may be injection molded from a polymer such as Noryl, PVC or ABS. In some embodiments, glass fibers may be added to the polymer prior to injection molding. In other embodiments, aspirator 300 may be made other materials such as metals, ceramics, or other polymers and may be formed using other casting, molding, sculpting, or assembly processes. In an exemplary embodiment, aspirator 300 is injection molded into a single piece. However, in other embodiments, aspirator may be assembled from several separate pieces. Advantageously, aspirator 300 may be manufactured separately from adapter 110 and subsequently inserted into position.

Peg 310 or slot 306 may be configured to engage a corresponding component of adapter 110 for securing aspirator 300 in an operating position within adapter 110. In some embodiments, peg 310 or slot 306 may releasably couple aspirator 300 to valve cartridge 100. Advantageously, aspirator 300 may couple to valve cartridge 100 in a plurality of orientations. For example, aspirator 300 may be removed from valve cartridge 100, rotated 180°, and re-inserted into valve cartridge 100 in the new orientation. This ability allows valve cartridge 100 to be installed in a different orientation (e.g., rotated 180°) relative to an installation surface while maintaining aspirator 300 in the same orientation relative to the surface.

For example, in the case of back-to-back showers on opposite sides of a shared wet wall, the directions in which the hot and cold water supply lines approach cartridge 100 are reversed for one of the showers. Rather than re-plumbing the hot and cold water lines for one of the showers, valve cartridge 100 may be rotated by 180° to allow conventional operation of the valve (e.g., such that cold water enters through a first inlet port and hot water enters through a second inlet port). However, if aspirator 300 were permanently attached to the valve cartridge, such rotation would cause aspirator 300 to be upside down, thereby introducing the possibility that aspirator 300 may not function properly. The ability to install aspirator 300 in multiple orientations relative to the valve cartridge may allow aspirator 300 to be removed from the valve cartridge, rotated into another orientation (e.g., by 180°), and re-inserted into the valve cartridge.

Figure 3A:
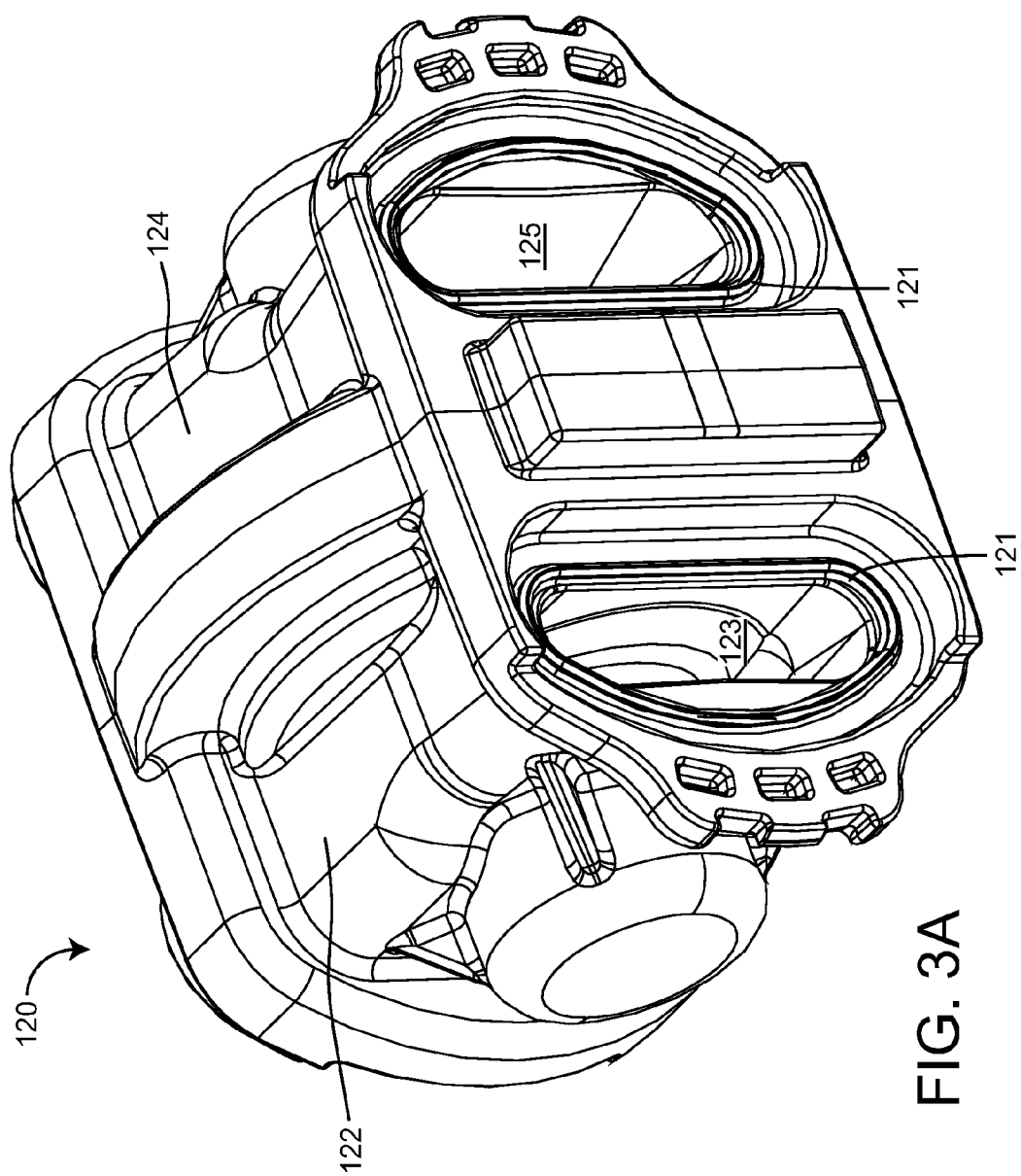
FIG. 3A is a perspective view of the pressure balance unit, according to an exemplary embodiment.
Figure 3B:
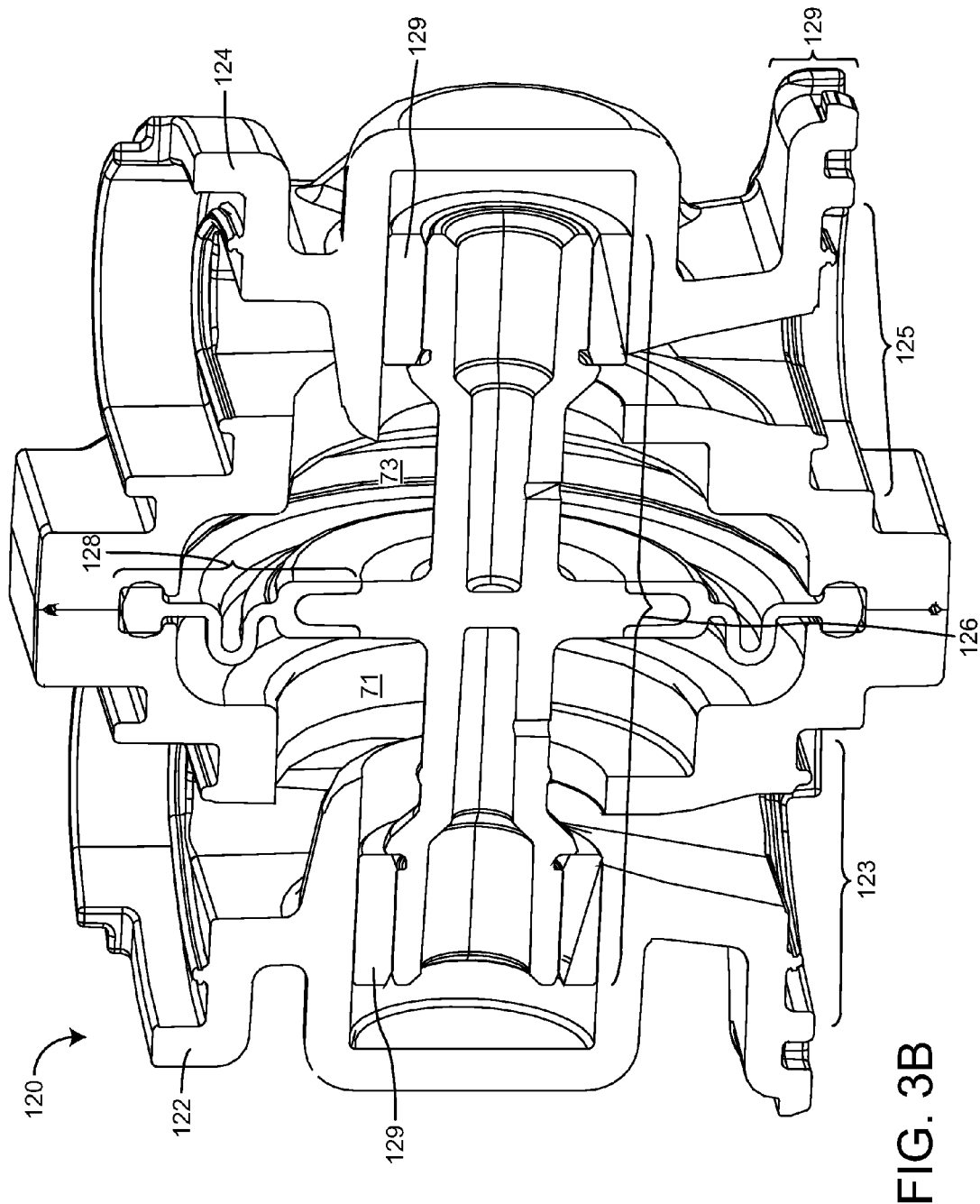
FIG. 3B is a half-sectional view of the pressure balance unit, according to an exemplary embodiment.

Referring now to FIGS. 3A and 3B, concentric cartridge 100 may include a pressure balance unit 120. Pressure balance unit 120 may respond to a difference in pressure between the fluid supply lines and reduce or limit the flow rate of the fluid with the higher fluid pressure. Pressure balance unit 120 may include a first shell 122, a second shell 124, a sliding element 126, a diaphragm 128 extending from a center portion of sliding element 126, and sleeves 129 inserted over the ends of sliding element 126. First shell 122 and second shell 124 may be aligned using a tongue-and-groove alignment system and united (e.g., connected, linked, attached, joined, welded, etc.) to form a cohesive unit. Sliding element 126 may be positioned within shells 122,124 and may be movable along a longitudinal axis defined by a shaft of sliding element 126. Diaphragm 128 may be overmolded onto sliding element 126 and secured inside shells 122,124 along an outer perimeter of diaphragm 128. Diaphragm 128 may form a flexible and pressure-sensitive barrier between shells 122, 124.

Pressure balance unit 120 may further include inlet ports 123,125. Ports 123,125 may receive fluid from inlet adapter 110 via connection ports 113,115. In some embodiments, ports 123,125 may be kidney-shaped. Advantageously, kidney-shaped ports 123,125 may allow rotation of pressure balance unit 120 relative to connection ports 113,115 while maintaining the fluid connection between ports (e.g., between ports 113 and 123 and between ports 115 and 125).

Referring specifically to FIG. 3A, pressure balance unit 120 may include perimeter seals 121 around ports 123,125. In some embodiments, seals 121 may form a fluid barrier between ports 123,125 and volume control plate 130. In other embodiments, seals 121 may form a fluid barrier between pressure balance unit 120 and an intermediate transition element (e.g., between pressure balance unit 120 and volume control plate 130) such as transition element 190, described in greater detail in reference to FIG. 4C. In some embodiments, seals 121 form a fluid barrier between two elements (e.g., pressure balance unit 120, volume control plate 130, transition element 190, etc.) which do not rotate relative to one another (e.g., both elements do not rotate or both rotate at the same rate and in the same direction). In other embodiments, seals 121 may be configured to maintain a fluid barrier between elements having a relative rotation.

Referring specifically to FIG. 3B, in some embodiments, shells 122,124 may include a connection mechanism 129 for fastening pressure balance unit 120 to volume control plate 130 or transition element 190. In an exemplary embodiment, mechanism 129 is a fringe along an edge of pressure balance unit 120 to which a portion of volume control plate 130 may attach. In other embodiments, coupling mechanism 129 may include a groove, slot, indentation, channel, snap, peg, extrusion, fitting, fastener, or other connecting feature. Pressure balance unit 120 may be coupled to volume control plate 130 or transition element 190 rotatably (e.g., the connection may allow rotation between components), releasably (e.g., components may be separated and reconnected), or permanently (e.g., with an adhesive compound, welding, or other permanent or semi-permanent connection means).

Still referring to FIG. 3B, in operation, a first fluid (e.g., hot water) may exit inlet adapter 110 via connection port 113 and enter pressure balance unit 120 via inlet port 123. A second fluid (e.g., cold water) may exit inlet adapter 110 via connection port 115 and enter pressure balance unit 120 via inlet port 125. Diaphragm 128 may separate a first pressure chamber 71 from a second pressure chamber 73 within pressure balance unit 120. Diaphragm 128 may form a watertight barrier, thereby preventing cross-flow between fluid channels. Due to the flexibility of diaphragm 128, a difference in fluid pressure between the fluids contained within shells 122,124 may cause diaphragm 128 to expand, bulge, or otherwise deflect into the shell having the lower pressure. This deflection may cause sliding element 126 to slide over an inlet port fluidly connected to the pressure chamber (e.g., pressure chamber 71 or 73) having the higher pressure, thereby reducing the volumetric flow rate of the high-pressure fluid.

In some embodiments, pressure balance unit 120 may include a thermostatic component. The thermostatic component may provide for temperature regulation in addition to pressure balancing functionality. The thermostatic component may be an additional component inserted in series with the aforementioned components of pressure balance unit 120 or may be integrated into the previously described components. For example, sliding element 126 and/or diaphragm 128 may be biased toward one of pressure chambers 71,73 based on the temperature of the first or second fluid. As the fluid temperature changes, the thermostatic component may alter the bias of sliding element 126 and/or diaphragm 128 (e.g., the thermostatic offset), thereby increasing or decreasing the open cross-sectional area of the inlet ports leading into pressure chambers 71,73. In some embodiments, pressure balance unit 120 may be a combination pressure balance and temperature balance (e.g., thermostatic) unit. In other embodiments, the pressure balance unit 140 may be replaced by a thermostatic component.

Figure 4A:
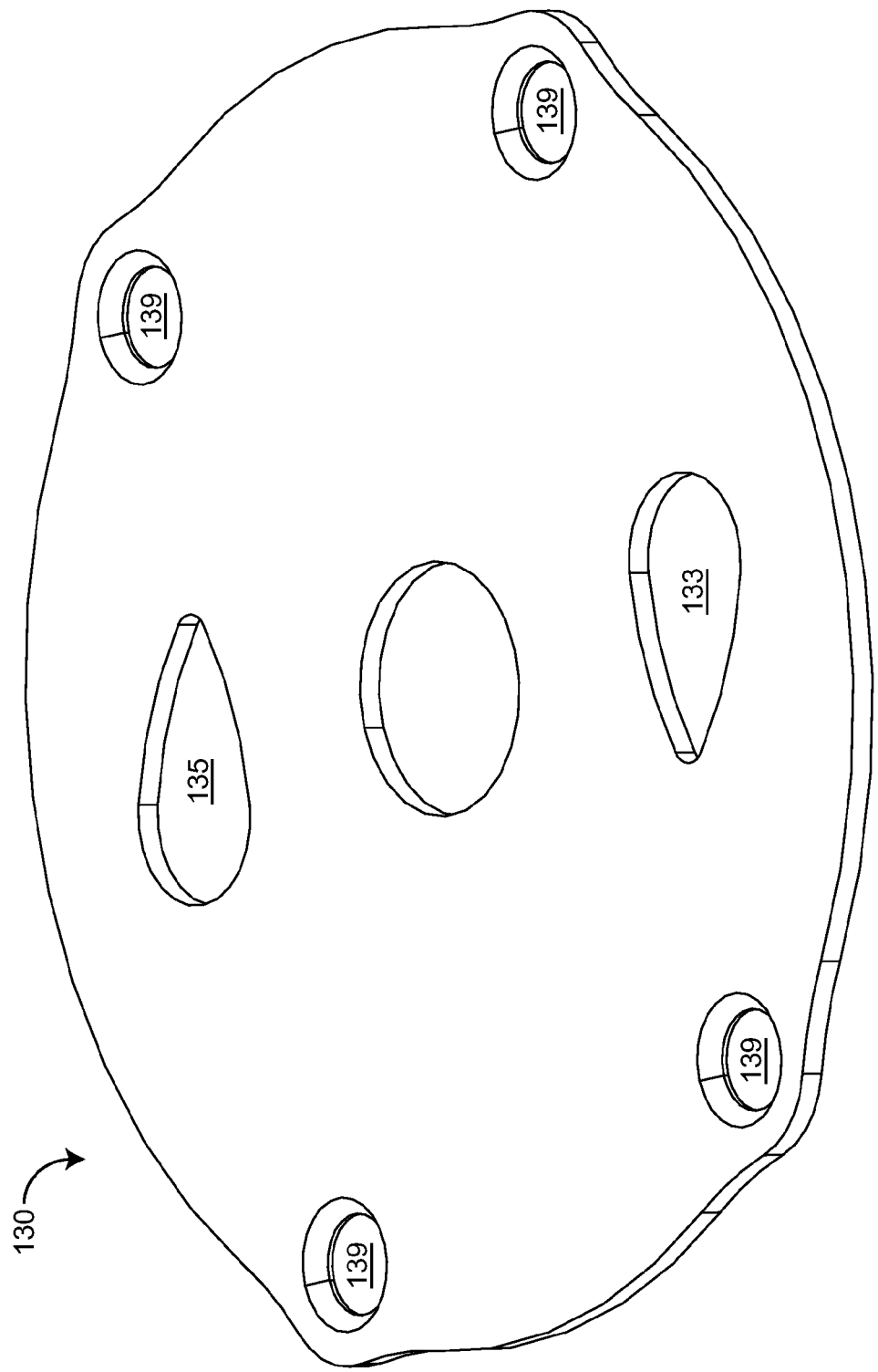
FIG. 4A is a drawing illustrating the volume control plate, according to an exemplary embodiment.

Referring now to FIG. 4A, concentric cartridge 100 may further include a volume control plate 130. Volume control plate may include a first opening 133, a second opening 135, and a coupling mechanism 139, according to an exemplary embodiment. In some embodiments, volume control plate 130 may be a thin disc having a first opening 133 and a second opening 135 extending through the disc. Openings 133,135 may be substantially circular, oval-shaped, teardrop-shaped, kidney-shaped, or any other shape. In some embodiments, openings 133,135 may remain at least partially within kidney-shaped perimeter seals 108 as plate 130 rotates relative to inlet adapter 110. Advantageously, remaining within perimeter seals 108 may allow seals 108 to maintain contact with plate 130 regardless of the rotational position of volume control plate 130, thereby reducing the potential for wear or damage to perimeter seals 108.

In some embodiments, volume control plate 130 may include a coupling mechanism 139. In the embodiment illustrated in FIG. 4A, coupling mechanism 139 is a series of holes through which bolts, screws, pegs, or other fasteners may be inserted. In other embodiments, coupling mechanism 139 may include a peg, slot, hole, flange, snap, or any other fastening, linking, or coupling component. Mechanism 139 may be used to attach, secure, or otherwise fasten volume control plate 130 to pressure balance unit 120 or to transition element 190. In other embodiments, coupling mechanism 139 may secure volume control plate 130 to adapter 110, housing 160, or any other component.

Figure 4B:
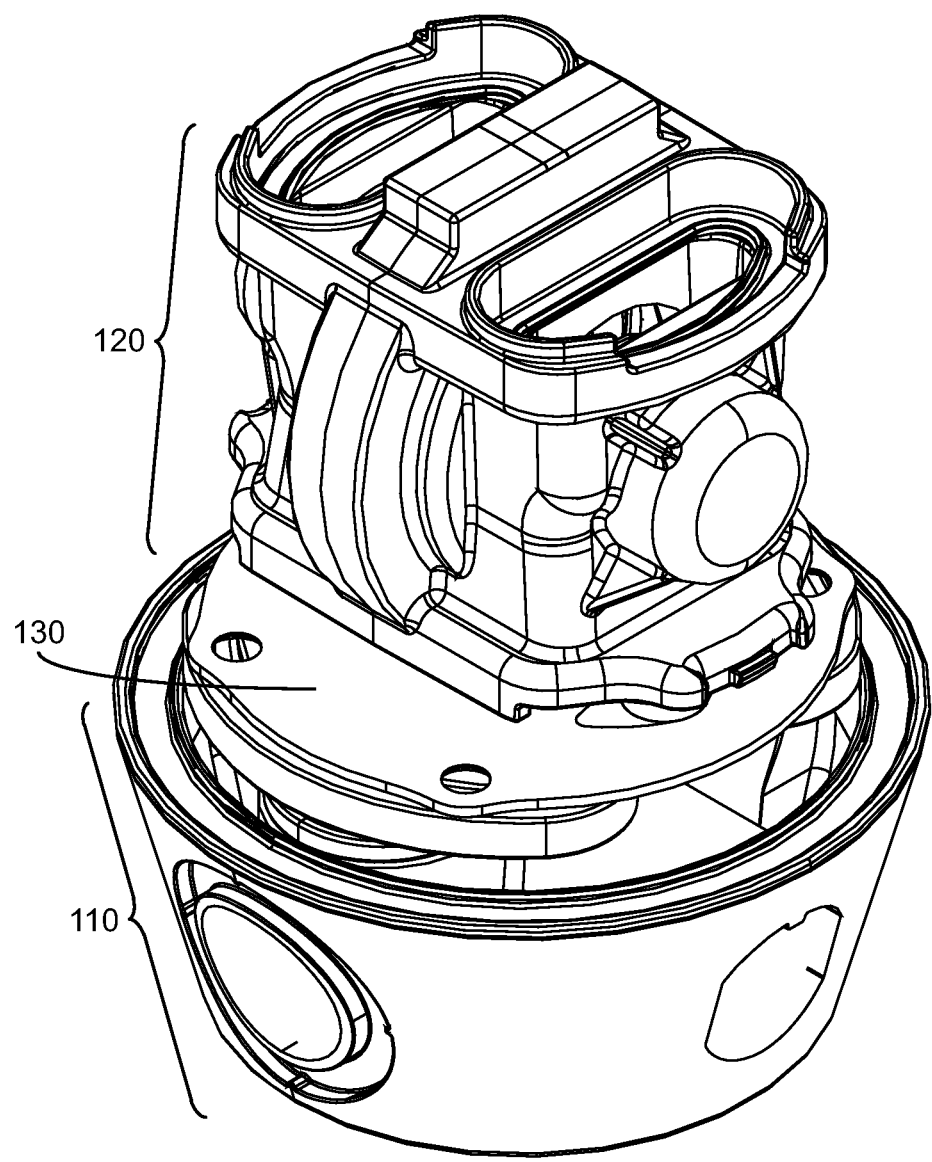
FIG. 4B is a drawing of the volume control plate positioned between the pressure balance unit and the inlet adapter, according to an exemplary embodiment.

Referring now to FIG. 4B, volume control plate 130 may be positioned between inlet adapter 110 and pressure balance unit 120. Volume control plate 130 may be rotatable relative to inlet adapter 110 between a full-volume position in which fluids from connection ports 113,115 are permitted to flow through plate 130 and a no-volume position in which fluids from connection ports 113,115 are blocked (e.g., due to misalignment between ports 113,115 and openings 133,135) from passing through plate 130. In some embodiments, openings 133,135 may be aligned with connection ports 113,115 when plate 130 is in the full-volume position and misaligned with connection ports 113,115 (e.g., such that no fluid connection exists) when plate 130 is in the no-volume position.

In some embodiments, volume control plate 130 may be rotated by 90° between the full-volume position and the no-volume position. In other embodiments, the transition between the full-volume position and the no-volume may be accomplished by a greater or lesser rotation or by lateral movement of volume control plate 130 relative to inlet adapter 110. In some embodiments, plate 130 may rotate along with pressure balance unit 120 and/or transition element 190 relative to adapter 110. In other embodiments, plate 130 may rotate relative to any combination of pressure balance unit 120, transition element 190, and adapter 110.

Figure 4D:
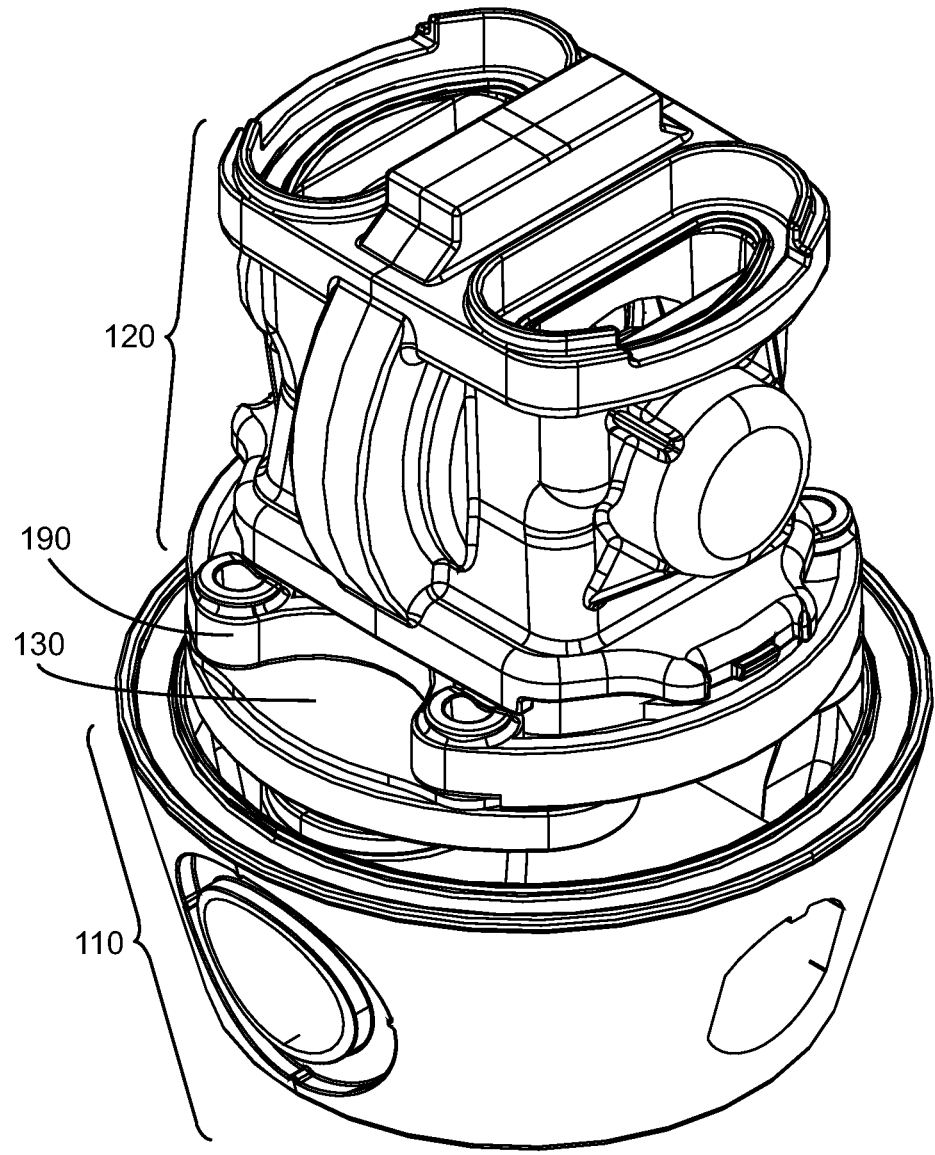
FIG. 4D is a drawing of the transition element positioned between the pressure balance unit and the volume control plate, according to an exemplary embodiment.

Referring now to FIG. 4C, transition element 190 is shown, according to an exemplary embodiment. In some embodiments, transition element 190 may function as an intermediary between volume control plate 130 and pressure balance unit 120. For example, referring to FIG. 4D, transition element 190 is shown positioned between volume control plate 130 and pressure balance unit 120.

Referring again to FIG. 4C, transition element 190 may include openings 193,195. Openings 193,195 may be configured to align with ports 123,125 of pressure balance unit 120 as well as openings 133,135 in volume control plate 130. In some embodiments, openings 193,195 may have a non-uniform cross-sectional area. In other words, the shape of openings 193,195 may change as openings 193,195 extend through transition element 190. In some embodiments, one side of openings 193,195 may be kidney-shaped. The kidney-shape may be configured to align with kidney-shaped ports 123,125 in pressure balance unit 120. The other side of openings 193,195 may be circular. The circular shape may be configured to align with openings 133,135 in volume control plate 130.

In some embodiments, transition element 190 may include a coupling mechanism 199. In the exemplary embodiment shown in FIG. 4C, coupling mechanism 199 is a series of holes through which bolts, screws, pegs, or other fasteners may be inserted. The holes may be configured to align with holes (e.g., coupling mechanism 139) in volume control plate 130. In other embodiments, coupling mechanism 199 may include a peg, slot, hole, flange, snap, or any other fastening, linking, or coupling component. Mechanism 199 may be used to attach, secure, or otherwise fasten transition element 190 to volume control plate 130, pressure balance unit 120, or any other component.

In some embodiments, transition element 190 may include openings 197. Openings 197 may be holes, gaps, slots, or other means by which fluid may pass through or around transition element 190. Openings 197 may provide a fluid path through which the mixed fluid travel before re-entering inlet adapter 110. In some embodiments, openings 197 are positioned at an edge of transition element 190 such that openings 197 define indentations into a side of transition element 190. In other embodiments, openings 197 are surrounded on all sides by transition element 190. Openings 197 may be circular, semi-circular, or have any other shape.

Figure 5A:
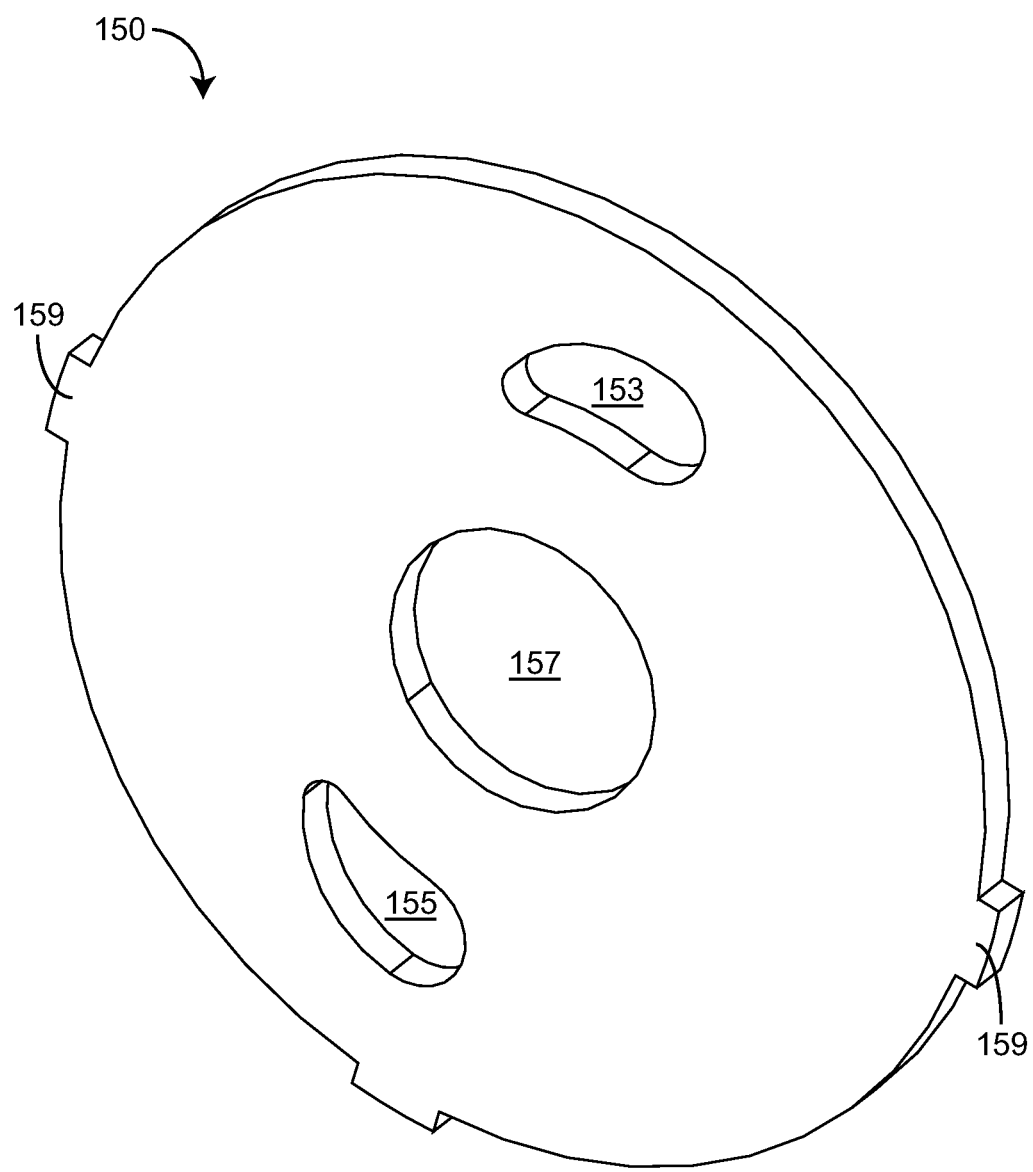
FIG. 5A is a drawing of the mixing plate including teardrop-shaped fluid openings, according an exemplary embodiment.
Figure 5B:
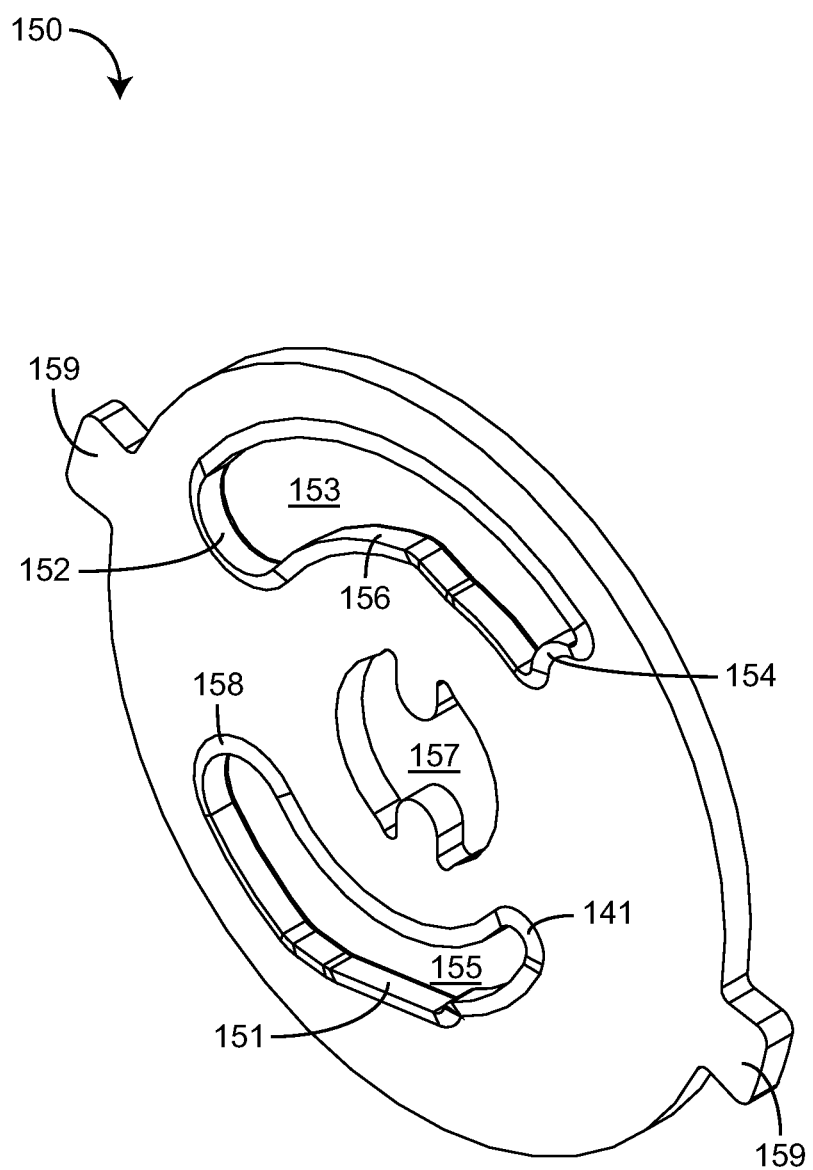
FIG. 5B is a drawing of the mixing plate including irregularly-shaped fluid openings, according to an exemplary embodiment.

Referring now to FIGS. 5A and 5B, mixing plate 150 is shown, according to a first and second exemplary embodiment. Mixing plate 150 may be used with concentric cartridge 100, a different concentric cartridge, a sequential fluid control cartridge, or any other fluid control or mixing device. Mixing plate 150 is not limited for use solely with a fluid control/mixing cartridge. Mixing plate 150 may be used as a stand-alone component or in combination with any other component or set of components. Mixing plate 150 may include a first opening 153, a second opening 155, a central opening 157, and flanges 159. In some embodiments, mixing plate 150 may be substantially circular.

Central opening 157 may extend completely through plate 150. In some embodiments, central opening 157 may allow a shaft or other element to extend through plate 150 for interaction with another component of cartridge 100. For example, a central shaft may extend through central opening 157 and attach to pressure balance unit 120. The central shaft may allow a user to cause rotation of pressure balance unit 120 without affecting the linear position or angular rotation of mixing plate 150.

In some embodiments, mixing plate 150 may include flanges 159. Flanges 159 may be used to secure plate 150 to housing 160 for holding plate 150 in a fixed position relative to the housing. In other embodiments, flanges 159 may attach, secure, or otherwise couple plate 150 to pressure balance unit 120, temperature control plate 140, or any other component of cartridge 100. In an exemplary embodiment, mixing plate 150 may include two flanges 159 spaced 180° apart. In other embodiments, more or fewer flanges 159 may be used and the spacing between flanges may be less than or greater than 180°.

In some embodiments, flanges 159 may extend radially from a circumferential edge of plate 150. In other embodiments, flanges 159 may extend in a direction transverse to plate 150 (e.g., in a direction perpendicular to the flat face) or obliquely from plate 150. In further embodiments, flanges 159 may extend radially inward from central opening 157. Inwardly extending flanges 159 may be used to couple plate 150 to a central shaft extending through plate 150.

Still referring to FIGS. 5A and 5B, mixing plate 150 may further include openings 153,155. In some embodiments, opening 153 may be aligned with a first outlet of pressure balance unit 120 and opening 155 may be aligned with a second outlet of pressure balance unit 120. Fluids from the first and second outlets in pressure balance unit 120 may pass through mixing plate 150 and combine to form a mixed fluid. In an exemplary embodiment, the first fluid is hot water, the second fluid is cold water, and the mixed fluid is water having an intermediate temperature. Mixing plate 150 may be configured to control the mixing ratio of the mixed fluid by controlling an amount of the first fluid permitted to pass through the disc relative to an amount of the second fluid permitted to pass through the disc. If the two fluids have different temperatures, mixing plate 150 may be configured to control the temperature of the mixed fluid.

Referring specifically to FIG. 5B, opening 153 may include a first end 152, a second end 154, and a side 156. Side 156 may extend between ends 152,154. Typical mixing plates may include circular, kidney-shaped, or teardrop-shaped openings. Teardrop-shaped openings generally include continuously curved sides which intersect at a point (e.g., a tip of the teardrop). In some embodiments, side 156 may be discontinuously curved. For example, side 156 may have multiple radii of curvature, radii of curvature centered around different points on either side of opening 153, straight edges intersecting at angles, straight edges combined with curved edges, or any other irregular profile. Similarly, opening 155 may include a first end 141, a second end 158, and a side 151. In some embodiments, side 151 may not be continuously curved. Sides 151,156 may have a complex or irregular profile. Advantageously, the complex or irregular profile of openings 153,155 may allow mixing plate 150 to achieve precise control over the fluid mixing ratio. This precise control may allow a user to achieve superior temperature control over the mixed fluid.

Figure 5C:
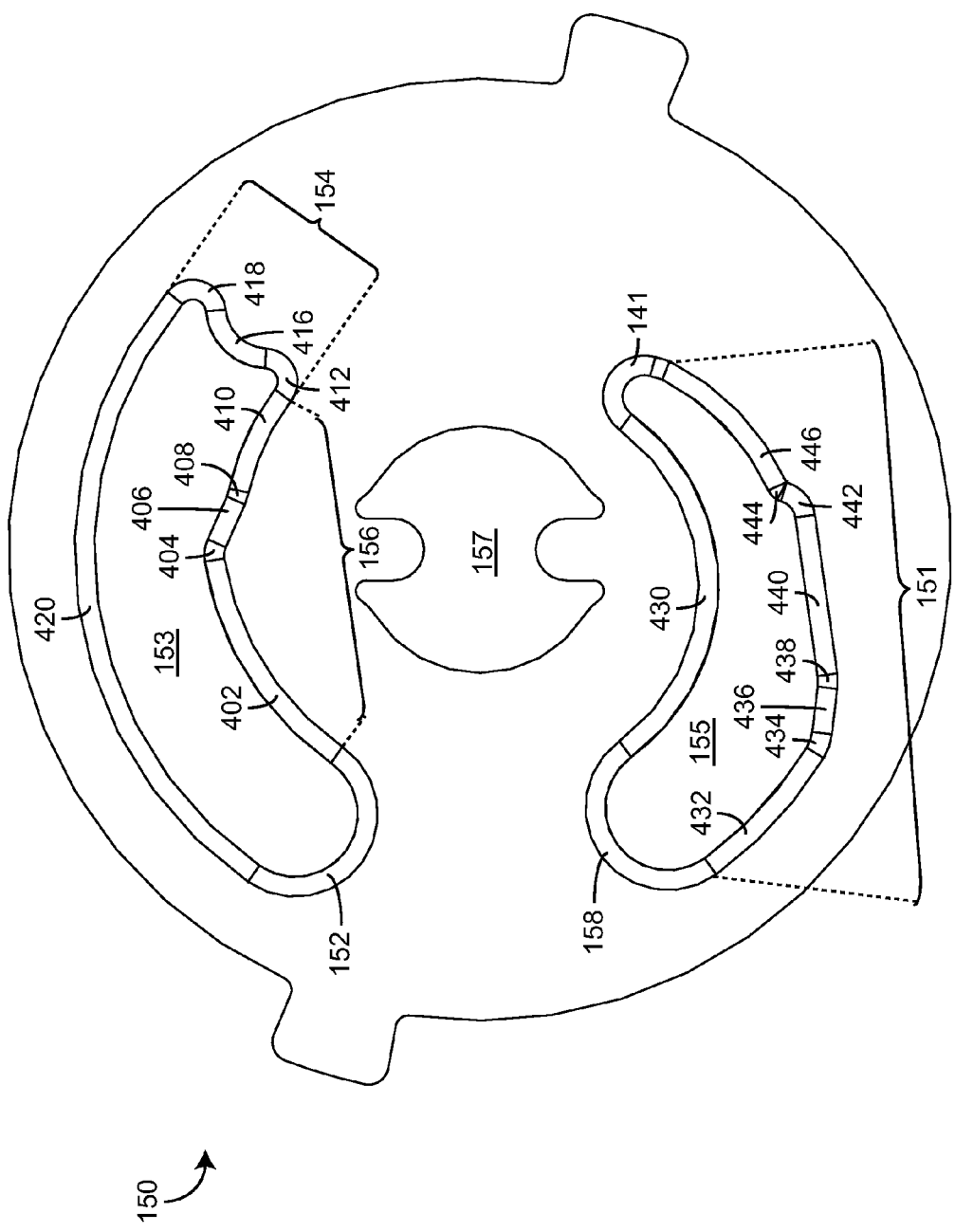
FIG. 5C is a plan view of the mixing plate including the irregularly shaped openings, according to an exemplary embodiment.

Referring now to FIG. 5C, a plan view of the mixing plate 150 of FIG. 5B is shown, according to an exemplary embodiment. FIG. 5C illustrates in detail the irregular profiles of openings 153,155. For example, opening 153 is shown to have a first end 152, a second end 154, a first side 156, and a second side 420. End 152 is shown as a continuous arc having a single radius of curvature. In some embodiments, end 152 may be approximately semi-circular. Second side 420 is also shown as a single continuous arc. However, in other embodiments, end 152 and side 420 may be broken into multiple segments having various radii of curvature.

End 154 is shown to include a plurality of arc segments 412, 416, and 418. Segments 412 and 418 are shown as "concave" arc segments with respect to opening 153 (e.g., segments having radii of curvature which intersect opening 153) whereas arc segment 416 is shown as a "convex" arc segment with respect to opening 153 (e.g., segments having radii of curvature which do not intersect opening 153). Segments 412,418 may have equal radii of curvature or different radii of curvature. Segment 416 may have a radius of curvature equal to, greater than, or less than either of the radii of curvature corresponding to segments 412,418.

Side 156 is shown to include a plurality of segments 402, 404, 406, 408, and 410. Segments 402-410 may have various radii of curvature and may be concave or convex with respect to opening 153. For example, segments 402, 404, and 410 are shown as convex arc segments with respect to opening 153. Segment 402 may have a first radius of curvature, segment 404 may have a second radius of curvature, and segment 410 may have a third radius of curvature. In some embodiments, the first, second, and third radii of curvature have discrete values. In other embodiments, two or more of the first, second, and third radii of curvature are equal or substantially equal. Side 156 may be an inner side of opening 153 or an outer side of opening 153, wherein the inner side has a lesser average distance to the center of mixing plate 150 than does the outer side.

Segment 408 is shown as a concave arc segment with respect to opening 153. Segment 408 may have a fourth radius of curvature. The fourth radius of curvature may be equal to, greater than, or less than any of the first, second, or third radii of curvature. Segment 406 is shown as a substantially linear segment (e.g., having an infinite radius of curvature). In some embodiments, two or more of segments 402-410 may be combined into a single segment or additional segments (e.g., other than the segments shown in FIG. 5C) may be present. The orientation, arrangement, or length of any of segments 402-410 may be varied in alternate embodiments.

Still referring to FIG. 5C, opening 155 is shown to have a first end 141, a second end 158, a first side 151, and a second side 430. First end 141, second end 158, and second side 430 are shown to each include a single arc segment. End 141 and end 158 are shown as concave with respect to opening 155 whereas side 430 is shown as convex with respect to opening 155. Segments 141,158,430 may have discrete radii of curvature or two or more of segments 141,158,430 may have substantially equal radii of curvature. In some embodiments, segments 141,158,430 may be broken into multiple segments having varying radii of curvature.

Side 151 is shown to include a plurality of segments 432, 434, 436, 438, 440, 442, 444, and 446. Segments 432,434, 438,442,446 are shown as concave with respect to opening 155 whereas segment 444 is shown as convex with respect to opening 155. Segments 436,440 are shown as substantially linear segments. In some embodiments, segments 432-446 may each have different radii of curvature. For example, segment 432 may have a first radius of curvature, segment 434 may have a second radius of curvature, segment 436 may have a third radius of curvature, segment 438 may have a fourth radius of curvature, segment 440 may have a fifth radius of curvature, segment 442 may have a sixth radius of curvature, segment 444 may have a seventh radius of curvature, and segment 446 may have an eighth radius of curvature. In some embodiments, any of the first through eighth radii of curvature may be equal or approximately equal. In other embodiments all eight radii of curvature may have separate values. In some embodiments, two or more of segments 432-446 may be combined into a single segment or additional segments may be present. The orientation, arrangement, or length of any of segments 432-446 may be varied in alternate embodiments.

Opening 153 may receive a fluid having a first temperature (e.g., a hot fluid) and opening 155 may receive a second fluid having a second temperature (e.g., a cold fluid). The temperature of the first fluid may be greater than the temperature of the second fluid. In some embodiments, the temperature of the hot fluid may be approximately 140° F. or approximately 60° C. The temperature of the cold fluid may be approximately 50° F. or approximately 10° C. The first fluid and the second fluid may pass through the first opening 153 and the second opening 155 respectively and combine to form a third fluid (e.g., a mixture of the first and second fluids) having a third temperature between the first and second temperature. A user may be able to control the temperature of the third fluid by controlling an amount of the first fluid and of the second fluid permitted to pass through openings 153,155 of mixing plate 150. Advantageously, the irregular profiles of openings 153,155 may allow mixing plate 150 to achieve precise control over the fluid mixing ratio. This precise control may allow a user to achieve superior temperature control over the mixed fluid. For example, the irregular profiles of openings 135,155 may facilitate a linear relationship between mixed-fluid temperature and angular rotation of the handle. A user may rotate a temperature control handle to effect such control.

Figure 5D:
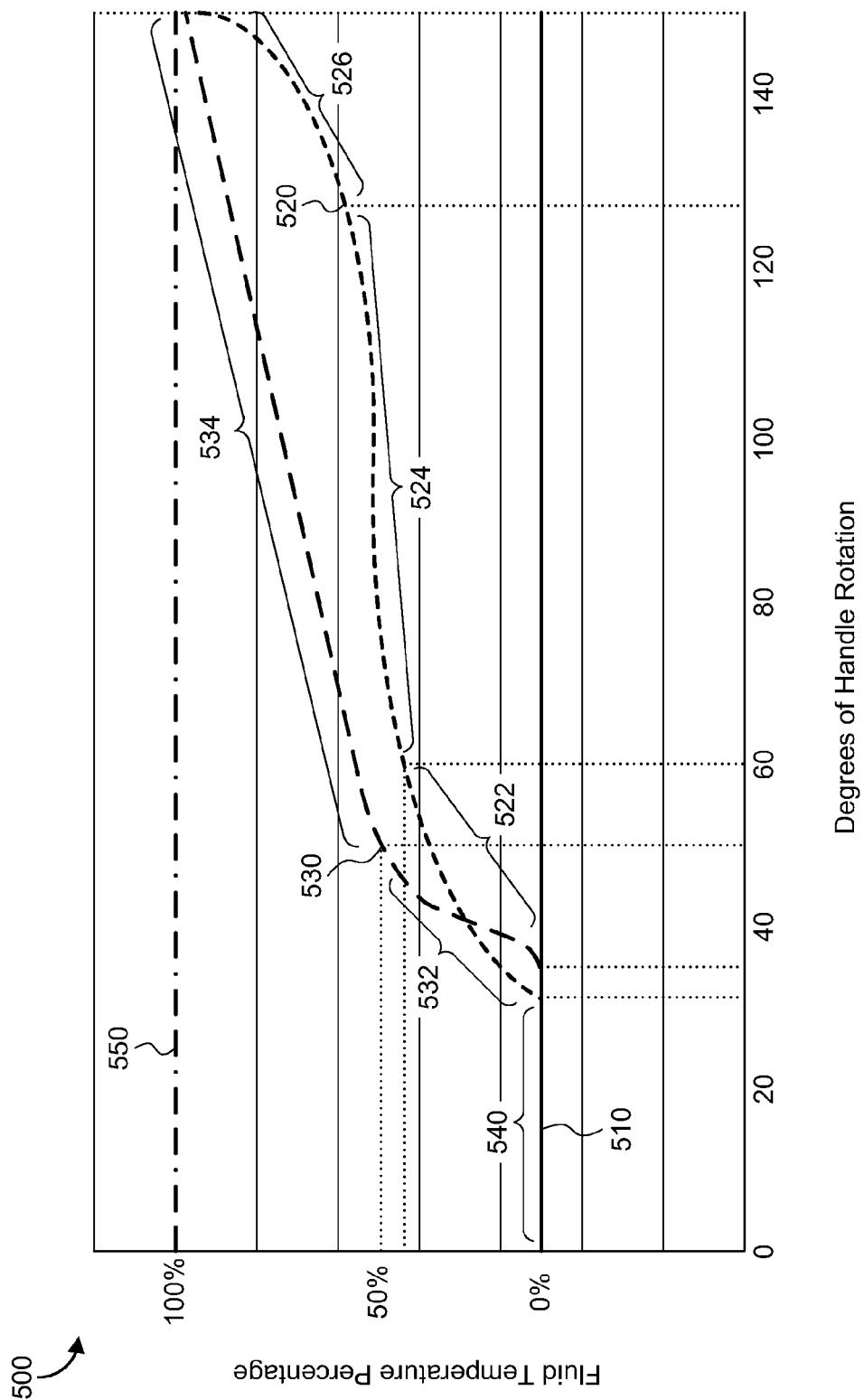
FIG. 5D is a graph illustrating an advantageously linear relationship between fluid temperature and angular rotation of a temperature control handle caused by the irregular shape of the fluid openings in the mixing plate, according to an exemplary embodiment.

Referring now to FIG. 5D, a chart 500 illustrating the temperature control performance of mixing plate 150 is shown, according to an exemplary embodiment. Line 510 represents the temperature of the cold fluid passing through opening 155 and line 550 represents the temperature of the hot fluid passing through opening 153. Curve 520 represents the performance of a conventional mixing plate design whereas curve 530 represents the performance of mixing plate 150.

Chart 500 illustrates the relative temperature of the mixed fluid (e.g., as a percentage of the difference between the cold fluid temperature 510 and the hot fluid temperature 550) as a function of the degrees of rotation of a control handle. For example a temperature percentage of "0%" corresponds to the cold fluid temperature 510 and a temperature percentage of "100%" corresponds to the hot fluid temperature 550. A temperature percentage of "50%" corresponds to a temperature halfway between the cold fluid temperature and the hot fluid temperature. The control handle may be a single handle for a sequential-type fluid control valve or a discrete temperature control handle or dial for a concentric-type fluid control valve.

Both curves 520,530 are shown to include an initial flat region 540. In region 540, rotation of the control handle may not result in any increase in the mixed fluid temperature. In some embodiments, region 540 may represent a volume control region (e.g., for a sequential-type fluid control valve). For example, rotation of the control handle from a 0 degree angle of rotation to an approximately 30 degree angle of rotation may increase the volumetric flow rate of the mixed fluid without increasing the temperature percentage.

Still referring to FIG. 5D, a user may desire a linear temperature response (e.g., a linear relationship between mixed fluid temperature and rotational angle of the control handle). Disadvantageously, conventional mixing plates may result in an "S-shaped" temperature response curve 520. For example, curve 520 is shown to include a first region 522, a second region 524, and a third region 526. In region 522, rotation of the temperature control handle by approximately 30 degrees (e.g. from a 30 degree angle of rotation to a 60 degree angle of rotation) may result in an increase of the mixed fluid temperature percentage from 0% (e.g. the cold fluid temperature) to approximately 45% (e.g., the cold fluid temperature plus approximately 45% of the difference between the cold fluid temperature and the hot fluid temperature).

Region 524 is a generally flat region in which continued rotation of the temperature control handle fails to effect a significant change in temperature. For example, in region 524, rotation of the temperature control handle by approximately 70 degrees (e.g., from a 60 degree angle of rotation to a 130 degree angle of rotation) may result in a mere 10% increase in the mixed fluid temperature percentage (e.g., from 45% to 55%).

Region 526 is a relatively sensitive region in which continued rotation of the temperature control handle by 20 degrees (e.g., from a 130 degree angle of rotation to a 150 degree angle of rotation) results in a significant 45% increase in mixed fluid temperature (e.g., from 55% to 100%).

Advantageously, mixing plate 150 is shown to result in an improved temperature response curve 530. For example, curve 530 is shown to include a first region 532 and a second region 534. In region 532, rotation of the temperature control handle by approximately 15 degrees (e.g., from a 35 degree angle of rotation to a 50 degree angle of rotation) may result in an initial increase in the mixed fluid temperature percentage of approximately 50% (e.g., from 0% to 50%). In region 534, rotation of the temperature control handle by 100 degrees (e.g., from a 50 degree angle of rotation to a 150 degree angle of rotation) may result in a substantially linear increase in the mixed fluid temperature percentage from approximately 50% to 100%. The irregular shape of openings 153,155 may achieve this desirable linear temperature response.

Figure 6A:
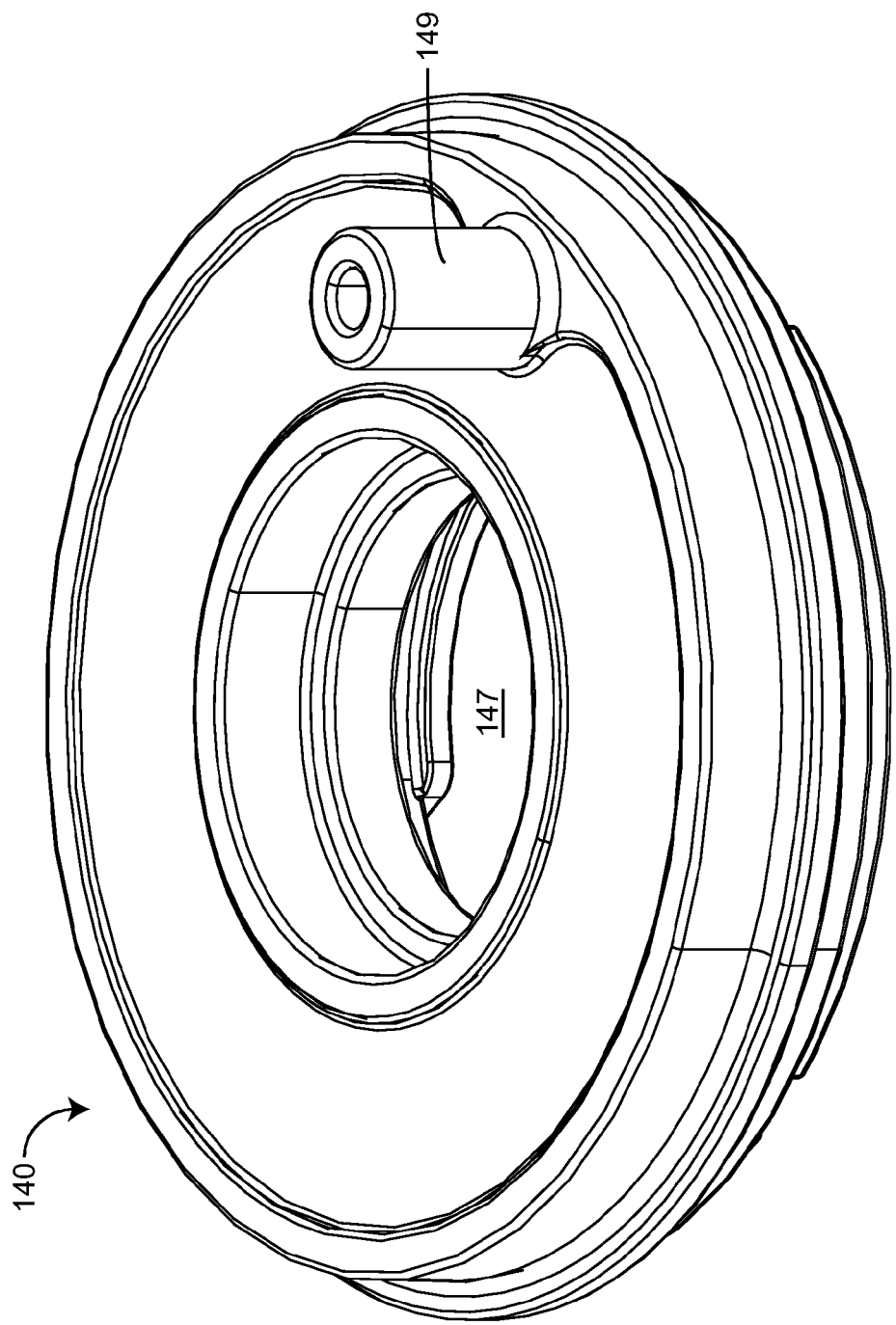
FIG. 6A is a top perspective view of the temperature control plate, according to an exemplary embodiment.
Figure 6B:
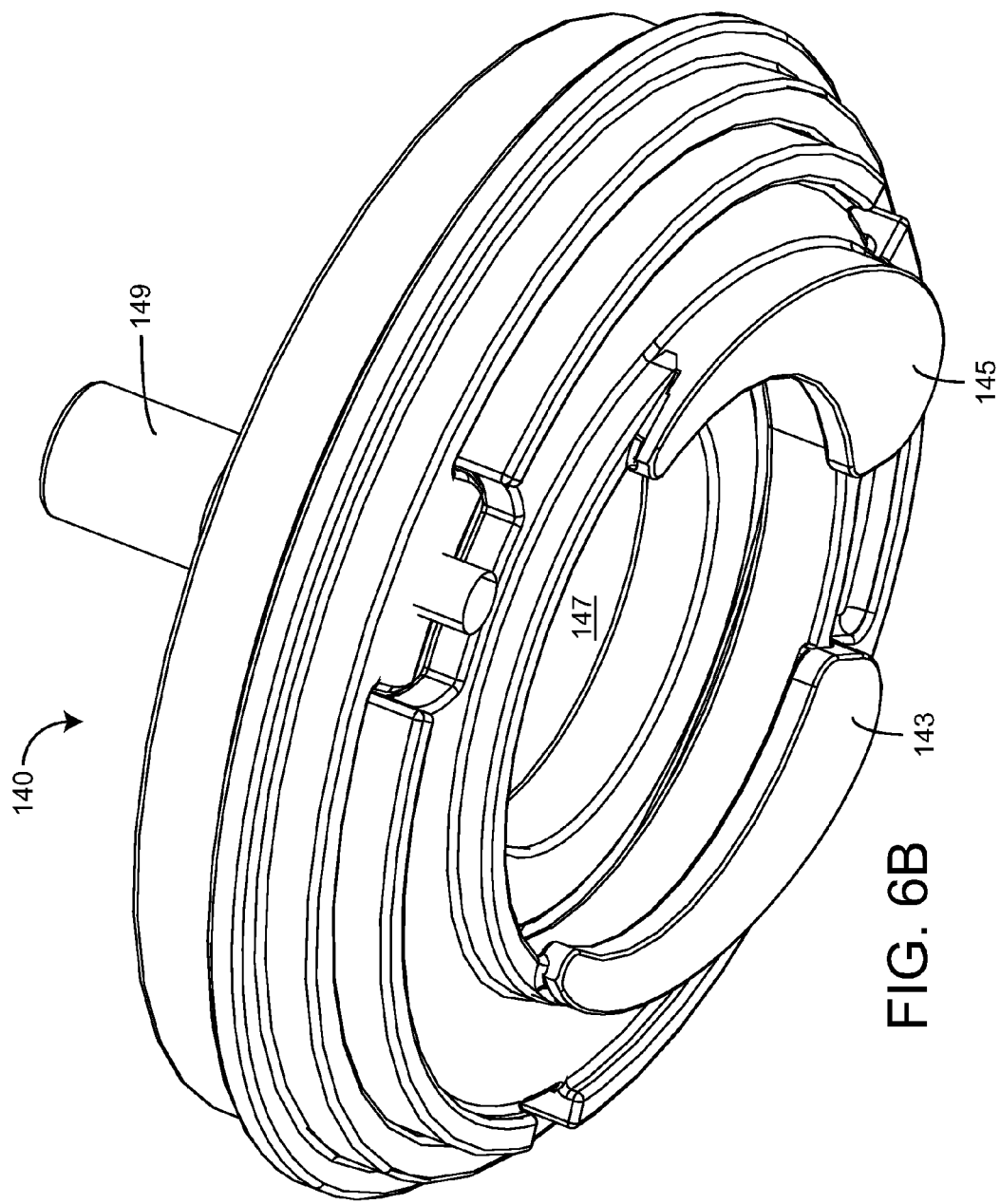
FIG. 6B is a bottom perspective view of the temperature control plate showing surfaces configured to cover and uncover openings in the mixing plate, according to an exemplary embodiment.

Referring now to FIGS. 6A and 6B, cartridge 100 may further include a temperature control plate 140. Temperature control plate 140 may include a first cover 143, a second cover 145, a central opening 147, and a connection pin 149. In some embodiments, temperature control plate 140 may be substantially circular. Temperature control plate 140 may be positioned adjacent to mixing plate 150. In some embodiments, plate 140 and may be rotatable relative to mixing plate 150. Rotation of temperature control plate 140 relative to mixing plate 150 may cover or uncover openings 153,155, thereby allowing a user to control the temperature of the mixed fluid. Temperature control plate 140 may be rotatable between a first position in which opening 153 is completely uncovered and opening 155 is completely covered and a second position in which opening 153 is completely covered and opening 155 is completely covered.

Temperature control plate 140 may include covers 143, 145. In some embodiments, covers 143,145 may align with openings 153,155 either partially or completely. The alignment of covers 143,145 with openings 153,155 may control the amount of the first and second fluids permitted to pass through openings 153,155 and enter the mixing chamber within cartridge 100. For example, when temperature control plate 140 is in the first position, cover 143 may completely uncover opening 153, thereby allowing the first fluid to flow through opening 153 and enter the mixing chamber. When temperature control plate 140 is in the second position, cover 145 may completely uncover opening 155, thereby allowing the second fluid to flow through opening 155 and enter the mixing chamber. When temperature control plate 140 is in an intermediate position (e.g., a position between the first position and the second position), cover 143 may partially block opening 153 and/or cover 145 may partially block opening 155, thereby allowing a controlled amount of each fluid to enter the mixing chamber.

In some embodiments, temperature control plate 140 may include a central opening 147. Central opening 147 may be aligned with opening 157 and may extend completely through temperature control plate 140. In some embodiments, central opening 147 may allow a shaft or other element to extend through plate 140 for interaction with another component of cartridge 100. For example, a central shaft may extend through central openings 147,157 and attach to pressure balance unit 120. The central shaft may allow a user to cause rotation of pressure balance unit 120 without affecting the position (e.g., linear or rotational position) of mixing plate 150.

Still referring to FIGS. 6A and 6B, in some embodiments, temperature control plate 140 may include a connection pin 149. In some embodiments, connection pin 149 may extend from temperature control plate 140 in a direction transverse to a face of plate 140 (e.g., axially). Connection pin 149 may be used to attach, secure, or otherwise kinematically couple temperature control plate 140 to a user-operable temperature control handle. For example, connection pin 149 may be configured to fit within a hole, slot, indentation, opening, or other connecting feature of the temperature control handle. Rotation of the temperature control handle may cause connection pin 149 to rotate about central opening 147, thereby causing temperature control plate 140 to rotate.

Figure 7:
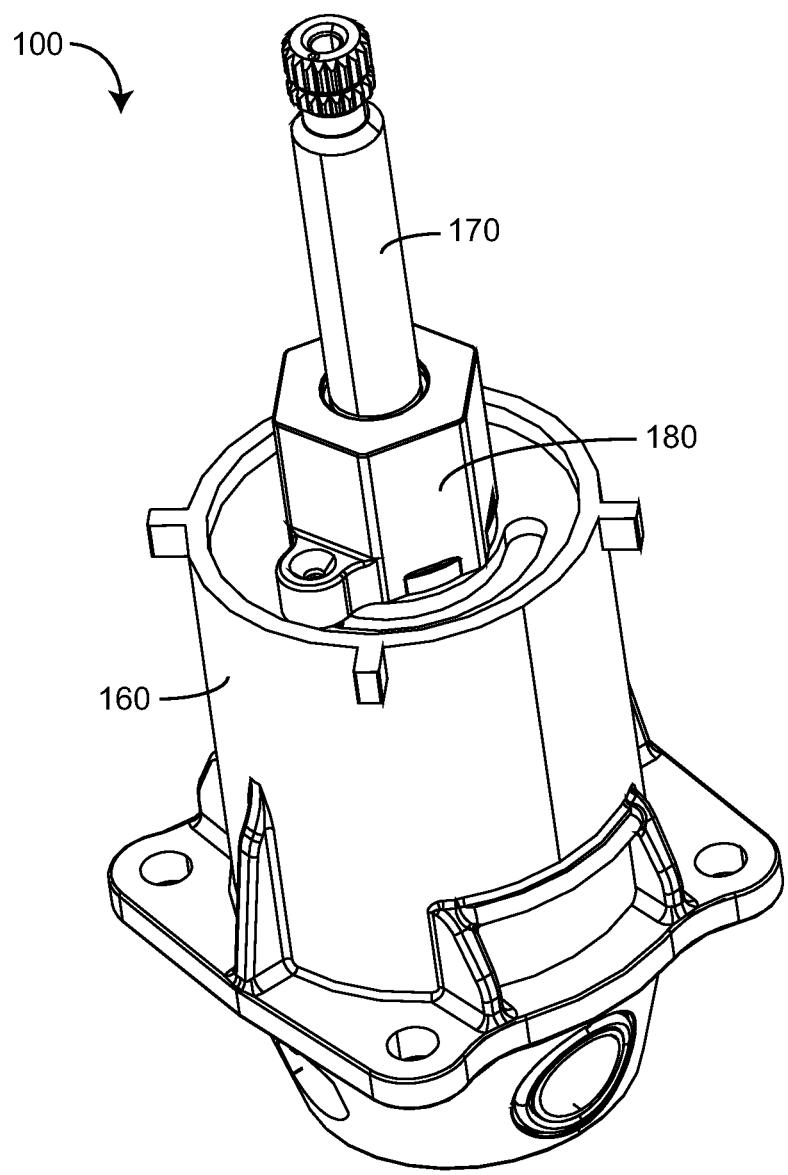
FIG. 7 is a drawing of the concentric cartridge showing a volume control shaft for rotating the volume control plate and a temperature control sleeve for rotating the temperature control plate and surrounding the central shaft, according to an exemplary embodiment.

Referring now to FIG. 7, a perspective view of concentric cartridge 100 is shown, according to an exemplary embodiment. In some embodiments, cartridge 100 may include a shaft 170. Shaft 170 may align with a central axis of cartridge 100 and may be referred to as a central shaft. Shaft 170 may be attached to pressure balance unit 120. Rotation of shaft 170 may cause pressure balance unit 120 to rotate. In some embodiments, rotation of shaft 170 may cause volume control plate 130 to rotate relative to adapter 110 (e.g., if volume control plate 130 is rotatably linked to pressure balance unit 120). Rotation of shaft 170 may increase or decrease the volumetric flow rate of the first and second fluids into pressure balance unit 120 by opening or closing ports 113,115. Thus, shaft 170 may be referred to as a volume control shaft. In some embodiments, shaft 170 may extend through openings 147,157 in temperature control plate 140 and mixing plate 150.

Still referring to FIG. 7, cartridge 100 may further include a sleeve 180. Sleeve 180 may be concentric with shaft 170 around the central axis of cartridge 100. In some embodiments, sleeve 180 may be attached to temperature control plate 140 (e.g. via connecting pin 149). Rotation of sleeve 180 may cause temperature control plate 140 to rotate relative to mixing plate 150, thereby increasing or decreasing the relative proportions of the first fluid and the second fluid permitted to enter the mixing chamber. Therefore, rotation of sleeve 180 may provide a means for controlling the temperature of the mixed fluid. Sleeve 180 may be referred to as a temperature control sleeve. Advantageously, shaft 170 and sleeve 180 may independently rotate about the central axis. In other words, rotation of shaft 170 may not cause rotation of sleeve 180 and rotation of sleeve 180 may not cause rotation of shaft 170. Independent rotation may allow a user to control each of the temperature and the volumetric flow rate of the mixed fluid without affecting the other.

Figure 8:
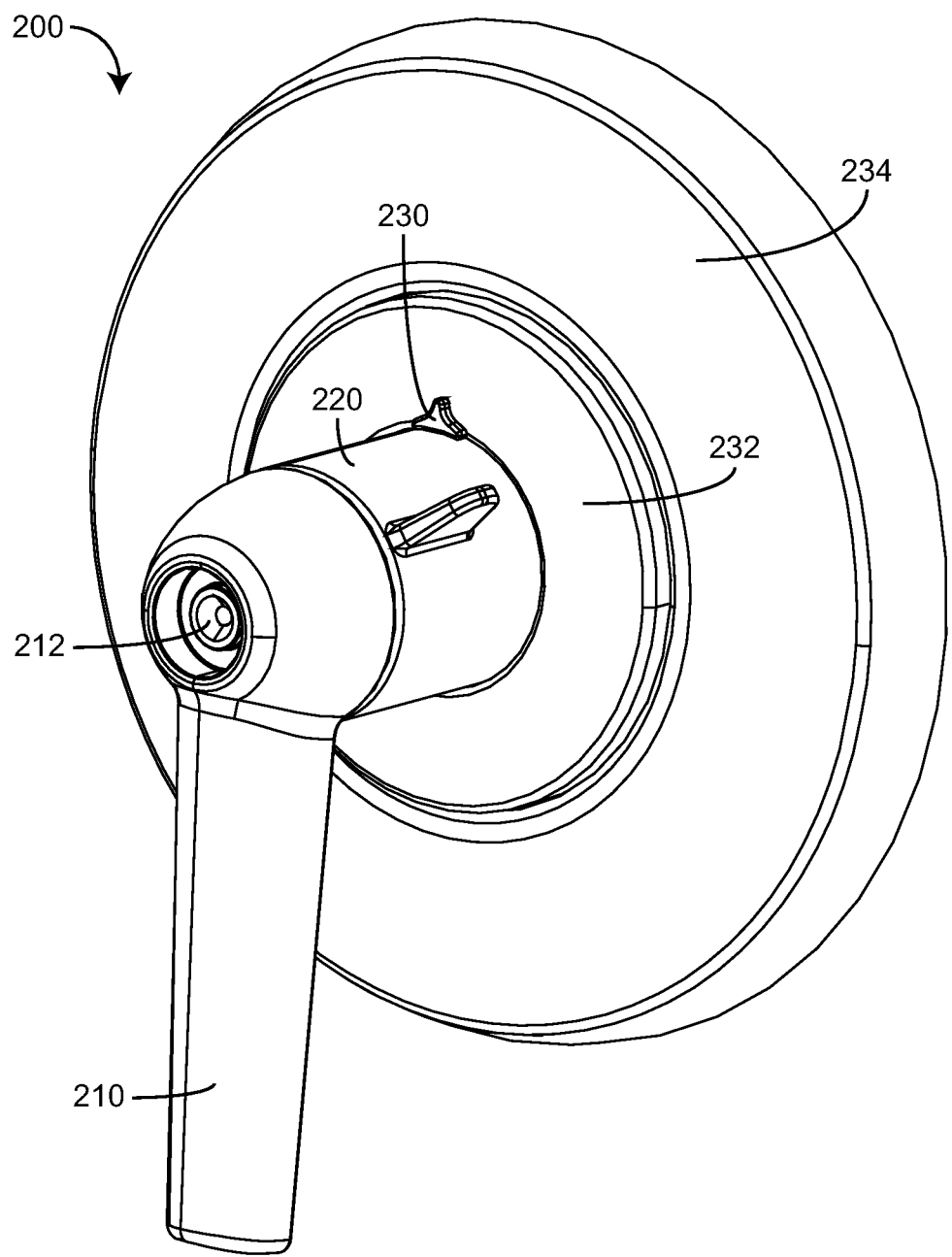
FIG. 8 is a drawing of a user interface for operating the concentric fluid control cartridge including a volume control handle, a temperature control handle, and a marker, according to an exemplary embodiment.

Referring now to FIG. 8, a concentric control interface 200 for use with concentric cartridge 100 is shown, according to an exemplary embodiment. Interface 200 may include a user-operable volume control handle 210, a user-operable temperature control handle 220, and a marker 230. Volume control handle 210 may be configured to attach to volume control shaft 170. Rotation of volume control handle 210 may cause rotation of volume control shaft 170, thereby increasing or decreasing the volumetric flow rate of one or more of the fluids. In some embodiments, volume control handle 210 may include a bore 212 configured to fit over an exposed end of volume control shaft 170. Bore 212 may include notches, grooves, slots, splines, indentations, extrusions, or other features configured to mate with corresponding features of volume control shaft 170. In other embodiments, volume control handle 210 may attach to volume control shaft 170 in other ways. For example, volume control handle 210 may include a coupling peg configured to fit within a hollow core of volume control shaft 170 such that the outer perimeter of volume control shaft 170 circumscribes the coupling peg.

Still referring to FIG. 8, concentric control interface 200 may further include a temperature control handle 220. Temperature control handle 220 may be configured to attach to temperature control sleeve 180. Rotation of temperature control handle 220 may cause rotation of temperature control sleeve 180, thereby controlling the temperature of the mixed fluid. In some embodiments, concentric cartridge 100 may be installed in a wall or other surface. When installed in a surface, temperature control handle 220 may be disposed between the surface and volume control handle 210. In some embodiments, temperature control handle 220 may circumscribe volume control shaft 170. Such circumscription may allow volume control shaft 170 to extend through temperature control handle 220 (e.g., in a direction away from the surface) before attaching to volume control handle 210.

Advantageously, handles 210,220 may be independently rotatable. For example, a user may set temperature control handle 220 to a desired position corresponding to a desired temperature of the mixed fluid. The user may then increase or decrease the volumetric flow rate of the mixed fluid via volume control handle 210 without changing the position of temperature control handle 220. Concentric cartridge 100 may be referred to as having "temperature memory" because the position of temperature control handle 220 may "remember" a previous temperature setting. Advantageously, such temperature memory may allow a user to make repeated use of cartridge 100 (e.g., when taking a shower, bathing, etc.) without having to set the desired fluid temperature upon each use.

In some embodiments, interface 200 may include a marker 230. Marker 230 may be a rotatable component concentric with volume control shaft 170 and temperature control sleeve 180. Marker 230 may be rotated by a user to indicate, designate, mark, or otherwise record an angular position of volume control handle 210 or temperature control handle 220. For example, a user may decide that a specific position of volume control handle 210 results in a preferred flow rate. The user may align marker 230 with volume control handle 210 in the preferred position. When the volume control handle is rotated into an "off" or "no-flow" position, marker 230 may remain in the preferred position. Upon subsequent operation of cartridge 100, the user may readily select the preferred flow rate by rotating volume control handle 210 into alignment with marker 230.

In some embodiments, marker 230 may be used to record a preferred temperature setting. For example, a user may decide that a specific position of temperature control handle 220 results in a preferred fluid temperature. The user may align marker 230 with temperature control handle 220 in the preferred position to indicate, mark, or record the preferred temperature position. Because it may be unnecessary to rotate temperature control handle 220 during normal operation of cartridge 100, marker 230 may be used to mark a second preferred temperature position. The second preferred temperature position may correspond to a preferred temperature for a second user (e.g., an adult user, a child user) or indicate a desirable temperature for another use of the mixed fluid (e.g., bath, shower, cleaning, etc.). In some embodiments, multiple markers 230 may be used to record a plurality of preferred positions for volume control handle 210 and temperature control handle 220. Different markers 230 may have different colors, shapes, or other distinguishing features. A user may associate a particular marker 230 with a preferred temperature setting, volume flow rate setting, or both.

The temperature control handle 220 includes a structure 222 (e.g., handle portion, fin, etc.) configured to facilitate grasping and rotation of the temperature control handle 220 by the user. As shown, the structure 222 has an aspect ratio such that the radial and/or axial dimensions of the structure 222 are much greater than the circumferential dimension. Such an aspect ratio facilitates alignment of the temperature control handle 220 with the marker 230.

According to the embodiment shown, the marker 230 is coupled to an inner portion 232 of the escutcheon. In such an embodiment, rotation of the marker 230 causes the inner portion 232 of the escutcheon to rotate relative to an outer portion of the escutcheon. According to various embodiments, the outer portion 234 of the escutcheon may be fixed relative to the wall, and the inner portion 232 and the outer portion 234 may be on a first or outer side of the wall while the valve cartridge is on a second or inner side of the wall. According to another embodiment, an intermediate portion of the escutcheon may be located radially between the inner portion 232 and the outer portion 234 of the escutcheon. The intermediate portion may rotate independently of, and relative to, the outer portion 234, the inner portion 232, the temperature control handle 220 and the volume control handle 210. The intermediate portion of the escutcheon may be advantageously used to provide a second marker to provide an additional volume or temperature control memory setting.

The inner portion 232 may include an annular groove about the outer diameter thereof for receiving a seal (e.g., o-ring, gasket, etc.) therein. Advantageously, such a seal may prevent water from passing between the inner portion 232 and the outer portion 234. Such a seal may also provide resistance to rotation of the inner portion 232, thereby increasing the efficacy of the inner portion 232 as a "memory" feature. According to another embodiment, the outer diameter annular groove of the inner portion 232 may receive an inwardly extending annular flange from the inner diameter of the outer portion 234, thereby creating a labyrinthine or tortuous path to prevent water from passing therebetween. According to various other embodiments, a seal may be located on the inner diameter of outer portion 234 to seal against the inner portion 232, and the inner portion 232 may have an outwardly extending flange to engage an annular groove in the inner diameter of the outer portion 234. One or more of the seal and/or tortuous path configurations may implemented between the inner diameter of the inner portion 232 and the outer diameter of the temperature control handle 220.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A concentric cartridge for a fluid mixing valve, the cartridge comprising:
   a stationary housing;
   an inlet adapter configured to receive a first fluid and a second fluid;
   a pressure balance unit;
   a volume control plate configured to rotate with the pressure balance unit and positioned between the inlet adapter and the pressure balance unit;
   a temperature control plate; and
   a mixing plate positioned between the pressure balance unit and the temperature control plate, wherein the mixing plate is fixed to the stationary housing such that the mixing plate remains substantially stationary;
   wherein the pressure balance unit and the volume control plate are rotatable relative to the inlet adapter to control a volume of the first and second fluids permitted to enter the pressure balance unit; and
   wherein the temperature control plate is rotatable relative to the stationary mixing plate and comprises covers configured to cover and uncover openings in the mixing plate to control relative amounts of the first and second fluids permitted to pass through the openings;
   wherein the temperature control plate and the pressure balance unit rotate independently from each other relative to the stationary housing such that:
      the temperature control plate remains substantially stationary relative to the stationary housing as the pressure balance unit is rotated relative to the stationary housing, and
      the pressure balance unit remains substantially stationary relative to the stationary housing as the temperature control plate is rotated relative to the stationary housing.

2. The concentric cartridge of claim 1, wherein the pressure balance unit and the volume control plate are rotatably coupled such that rotation of the pressure balance unit causes rotation of the volume control plate.

3. The concentric cartridge of claim 1, wherein the pressure balance unit and the volume control plate are configured to rotate between:
  a full-volume position in which the first fluid and the second fluid are permitted to flow through the volume control plate and into the pressure balance unit; and
  a no-volume position in which the first fluid and the second fluid are blocked from entering the pressure balance unit by the volume control plate.

4. The concentric cartridge of claim 1, wherein the temperature control plate is configured to rotate between:
  a first position in which the first fluid is permitted to enter a mixing chamber through a first opening in the mixing plate and the second fluid is blocked by the temperature control plate from entering the mixing chamber; and
  a second position in which the second fluid is permitted to enter the mixing chamber through a second opening in the mixing plate and the first fluid is blocked by the temperature control plate from entering the mixing chamber.

5. The concentric cartridge of claim 1, wherein the pressure balance unit is rotatable via a user-operable volume control handle and wherein the temperature control plate is rotatable via a user-operable temperature control handle.

6. The concentric cartridge of claim 1, wherein the mixing plate remains substantially stationary.

7. The concentric cartridge of claim 1, wherein the pressure balance unit is coupled to a central shaft defining an axis, and wherein rotation of the central shaft causes rotation of the pressure balance unit relative to the inlet adapter.

8. The concentric cartridge of claim 7, wherein the central shaft is configured to attach to a user-operable volume control handle, and wherein rotation of the volume control handle causes rotation of the central shaft.

9. The concentric cartridge of claim 7, wherein the temperature control plate is coupled to a connecting sleeve formed around the central shaft, and wherein rotation of the connecting sleeve causes rotation of the temperature control plate relative to the mixing plate.

10. The concentric cartridge of claim 9, wherein the connecting sleeve is configured to attach to a user-operable temperature control handle, and wherein rotation of the temperature control handle causes rotation of the connecting sleeve.

11. A concentric fluid control valve comprising:
  a stationary housing;
  a volume control shaft;
  a pressure balance unit configured to rotate with the volume control shaft;
  a temperature control sleeve located around the volume control shaft; and
  a temperature control plate configured to rotate with the temperature control sleeve;
  wherein the volume control shaft and the temperature control sleeve are independently rotatable about a shared axis such that the temperature control plate and the pressure balance unit rotate independently from each other relative to the stationary housing.

12. The concentric fluid control valve of claim 11, wherein the volume control shaft is configured to attach to a user-operable volume control handle and the temperature control sleeve is configured to attach to a user-operable temperature control handle;
  wherein rotation of the volume control handle causes rotation of the volume control shaft and rotation of the temperature control handle causes rotation of the temperature control sleeve.

13. The concentric fluid control valve of claim 12, further comprising:
  a first marker independently rotatable about the shared axis for indicating a first preferred position of the volume control handle or the temperature control handle,
  wherein the first marker remains substantially stationary during rotation of the volume control handle and during rotation of the temperature control handle.

14. The concentric fluid control valve of claim 11, further comprising a volume control plate having a first opening and a second opening, wherein rotation of the volume control shaft causes rotation of the volume control plate between:
  a first position in which the first and second openings are fluidly connected with respective first and second fluid supply lines; and
  a second position in which the first and second openings are not fluidly connected with the respective first and second fluid supply lines.

15. The concentric fluid control valve of claim 11, wherein rotation of the temperature control sleeve causes rotation of the temperature control plate between:
  a first position in which a first fluid is permitted to enter a mixing chamber and a second fluid is blocked from entering the mixing chamber; and
  a second position in which the second fluid is permitted to enter the mixing chamber and the first fluid is blocked from entering the mixing chamber.

16. The concentric fluid control valve of claim 11:
  wherein rotation of a handle between a first end position and a second end position controls an amount of a first fluid permitted to pass through the temperature control plate relative to an amount of a second fluid permitted to pass through the temperature control plate, the first and second fluids combining to form a mixed fluid;
  wherein the temperature control plate comprises an opening having complex profile configured to cause a substantially linear increase in a temperature of the mixed fluid as a function of a rotational position of the handle throughout at least a portion of a rotational range of the handle.

17. The concentric fluid control valve of claim 11, wherein the temperature control plate comprises a first opening configured to receive a first fluid having a first temperature and a second opening configured to receive a second fluid having a second temperature, wherein the first fluid and the second fluid combine to form a third fluid having a third temperature;
  the fluid control valve further comprising a control handle interconnected with the temperature control plate, wherein rotation of the control handle controls the third temperature;
  wherein at least one of the first opening and the second opening has an irregular profile configured to cause a substantially linear increase in the third temperature as a function of a rotational position of the handle throughout at least a portion of a rotational range of the handle.

* * * * *